US012070699B1

(12) United States Patent
Gu

(10) Patent No.: US 12,070,699 B1
(45) Date of Patent: Aug. 27, 2024

(54) ACCESSORY AND INFLATABLE DOLL

(71) Applicant: COMIN INTERNATIONAL INC, City of Industry, CA (US)

(72) Inventor: Yumin Gu, City of Industry, CA (US)

( * ) Notice: Subject to any disclaimer, the term of this patent is extended or adjusted under 35 U.S.C. 154(b) by 0 days.

(21) Appl. No.: 18/460,534

(22) Filed: Sep. 2, 2023

Related U.S. Application Data

(63) Continuation-in-part of application No. 18/195,373, filed on May 10, 2023.

(51) Int. Cl.

| | |
|---|---|
| ***A63H 3/06*** | (2006.01) |
| ***F04D 25/16*** | (2006.01) |
| ***F04D 27/00*** | (2006.01) |
| ***G09F 19/08*** | (2006.01) |

(52) U.S. Cl.
CPC ............. *A63H 3/06* (2013.01); *F04D 25/166* (2013.01); *F04D 27/00* (2013.01); *G09F 19/08* (2013.01); *G09F 2019/086* (2013.01)

(58) Field of Classification Search
CPC ........................................................ A63H 3/06
See application file for complete search history.

(56) References Cited

U.S. PATENT DOCUMENTS

| | | | | |
|---|---|---|---|---|
| 6,148,551 A * | 11/2000 | Glass | G09F 21/08 | 40/610 |
| 6,186,857 B1 * | 2/2001 | Gazit | G09F 15/0025 | 40/406 |
| 6,428,185 B1 * | 8/2002 | Lin | F21V 1/06 | 362/253 |
| 6,644,843 B2 * | 11/2003 | Chin-Cheng | A63H 27/10 | 446/226 |
| 6,786,793 B1 * | 9/2004 | Wang | A63H 27/10 | 446/176 |
| 6,804,905 B1 * | 10/2004 | Burger, III | G09F 15/0025 | 40/538 |
| 6,805,606 B1 * | 10/2004 | Kellum | A63H 3/36 | 92/92 |
| 7,216,446 B2 * | 5/2007 | Machala | G09F 19/00 | 446/221 |
| 7,302,769 B2 * | 12/2007 | Machala | G09F 15/0025 | 446/179 |
| 8,935,988 B1 * | 1/2015 | Perez | B60Q 7/00 | 116/63 P |
| 10,362,778 B2 * | 7/2019 | O'Shea | G01J 5/0025 | |
| 10,830,229 B1 * | 11/2020 | Lurker | F04B 35/04 | |

(Continued)

FOREIGN PATENT DOCUMENTS

CN 218420997 U * 2/2023

OTHER PUBLICATIONS

Translation CN218420997U (Year: 2023).*

*Primary Examiner* — Eugene L Kim
*Assistant Examiner* — Alyssa M Hylinski

(57) ABSTRACT

The present disclosure provides an accessory and an inflatable doll, the accessory includes a housing, a plurality of first air blowers at least partially mounted in the housing, and a main controller, the housing includes a first air inlet portion and a first air outlet portion, each first air blower includes a second air inlet portion communicated with the first air inlet portion and a second air outlet portion communicated with the first air outlet portion, the main controller is electrically connected to the first air blowers and configured to control operations of the first air blowers.

19 Claims, 20 Drawing Sheets

(56) References Cited

U.S. PATENT DOCUMENTS 11,071,294 B1 * 7/2021 Draeger .................. G09F 19/08
11,691,088 B1 * 7/2023 Gu ......................... A63H 3/006 446/220
2002/0089854 A1 * 7/2002 Liu ........................... F21V 3/00 362/311.06
2005/0190556 A1 * 9/2005 Machala ............. G09F 15/0025 362/294
2006/0150451 A1 * 7/2006 Spielberger .............. A63H 3/06 446/178
2007/0022642 A1 * 2/2007 Hsu ..................... G09F 15/0025 446/226
2007/0037475 A1 * 2/2007 Spear ..................... A63H 13/00 446/175
2007/0234604 A1 * 10/2007 Hsu ..................... G09F 15/0025 40/412
2012/0139727 A1 * 6/2012 Houvener .......... A63B 71/0622 340/540
2013/0008064 A1 * 1/2013 Park .................... G09F 15/0087 40/603
2015/0135569 A1 * 5/2015 Kusanovich ............ G09F 19/08 156/60
2015/0184844 A1 * 7/2015 Zhang ................. F21V 33/0028 362/96
2015/0292728 A1 * 10/2015 Gary ....................... G09F 19/02 362/253
2017/0072328 A1 * 3/2017 Sze .......................... A63H 3/06
2018/0117479 A1 * 5/2018 Coolidge ................. G09B 5/00
2018/0335760 A1 * 11/2018 de Grasse .............. H05B 47/19
2020/0316487 A1 * 10/2020 Hunter ................... A63H 17/34

* cited by examiner

ACCESSORY AND INFLATABLE DOLL

CROSS-REFERENCE TO RELATED APPLICATIONS

This application is a continuation-in-part of application Ser. No. 18/195,373 filed on May 10, 2023, the entire disclosure of which is hereby incorporated by reference herein.

FIELD

The present disclosure relates to the field of dolls, and in particular to an accessory and an inflatable doll having the accessory.

BACKGROUND

Supermarkets or amusement parks use inflatable dolls to create a friendly atmosphere to attract customers. However, the existing inflatable dolls have a single dynamic movement and are less attractive to customers. Thus, the present invention provides an inflatable doll that can solve the above problems.

SUMMARY

The present disclosure provides an accessory which includes a housing, a plurality of first air blowers at least partially mounted in the housing, and a main controller, the housing includes a first air inlet portion and a first air outlet portion, each first air blower includes a second air inlet portion communicated with the first air inlet portion and a second air outlet portion communicated with the first air outlet portion, the main controller is electrically connected to the first air blowers and configured to control operations of the first air blowers.

The present disclosure further provides an inflatable doll which includes a body defining a cavity and the accessory as described above, the body is connected with the accessory, the first air outlet portion and the second air outlet portion are both communicated with the cavity, and the main controller is configured to control at least one first air blower of the first air blowers to blow air into the cavity through the first air outlet portion and the second air outlet portion.

The present disclosure further provides an accessory which includes a housing having a first air inlet portion and a first air outlet portion, a plurality of first air blowers at least partially mounted in the housing, a sound system arranged on the housing, a lamp arranged on the sound system, and a main controller electrically connected to the first air blowers, the sound system and the lamp, each first air blower includes a second air inlet portion communicated with the first air inlet portion and a second air outlet portion communicated with the first air outlet portion, and the main controller is configured to control operations of the first air blowers, the sound system and the lamp.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
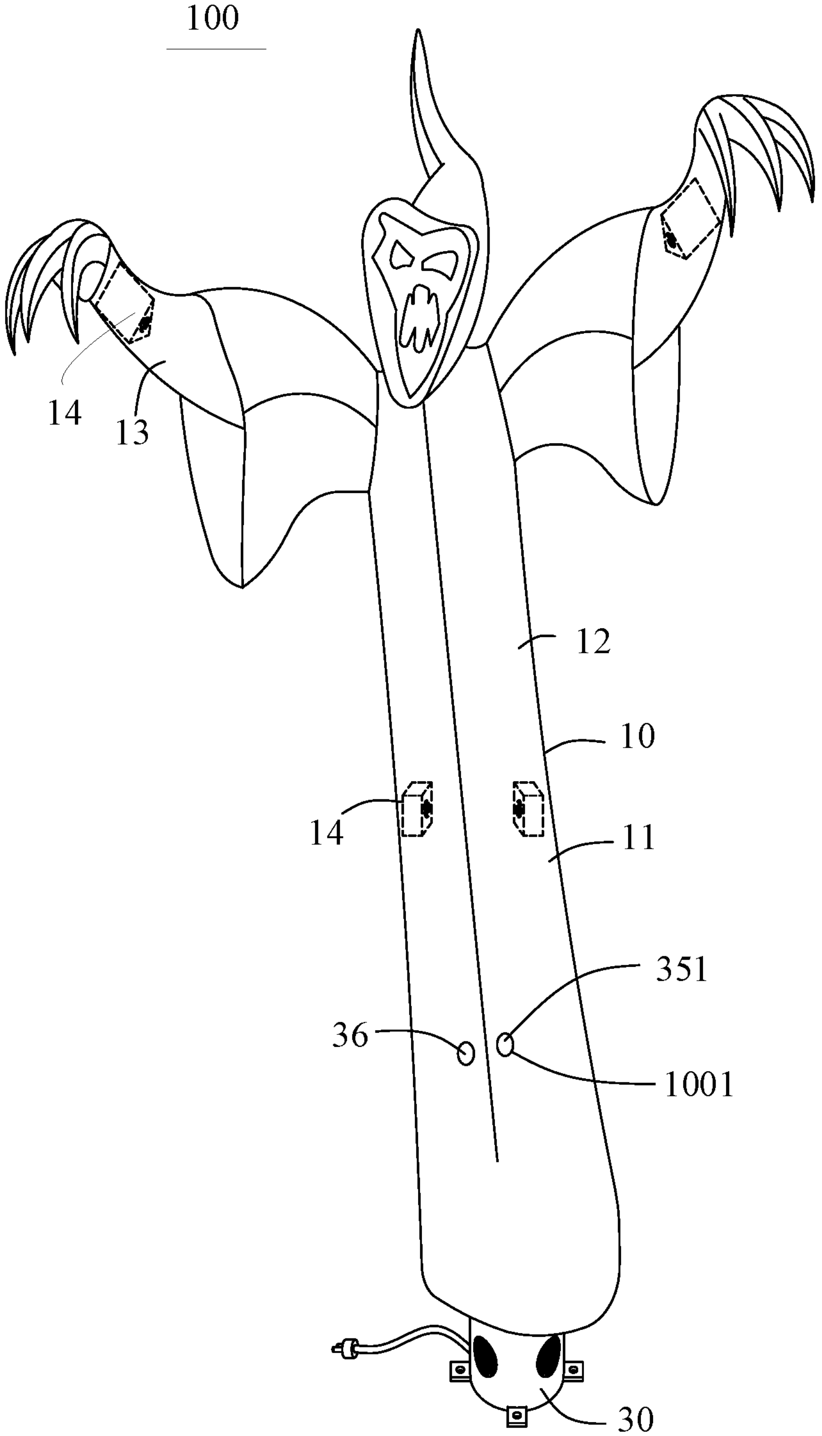
FIG. 1 is a structural schematic view of an inflatable doll in an inflated state according to an embodiment of the present disclosure.
Figure 2:
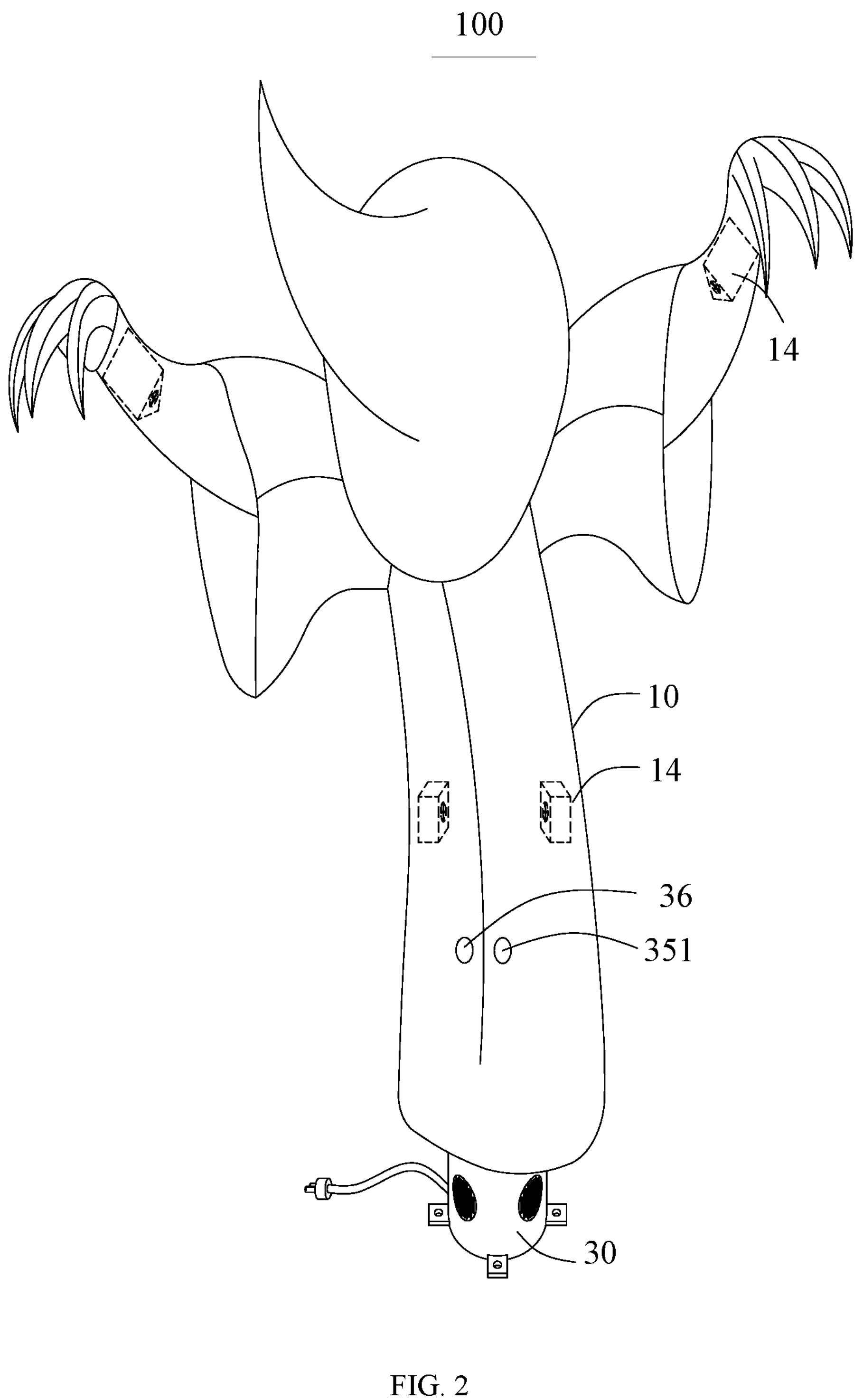
FIG. 2 is a structural schematic view of the inflatable doll of FIG. 1, wherein the inflatable doll bows to pay respect.
Figure 3:
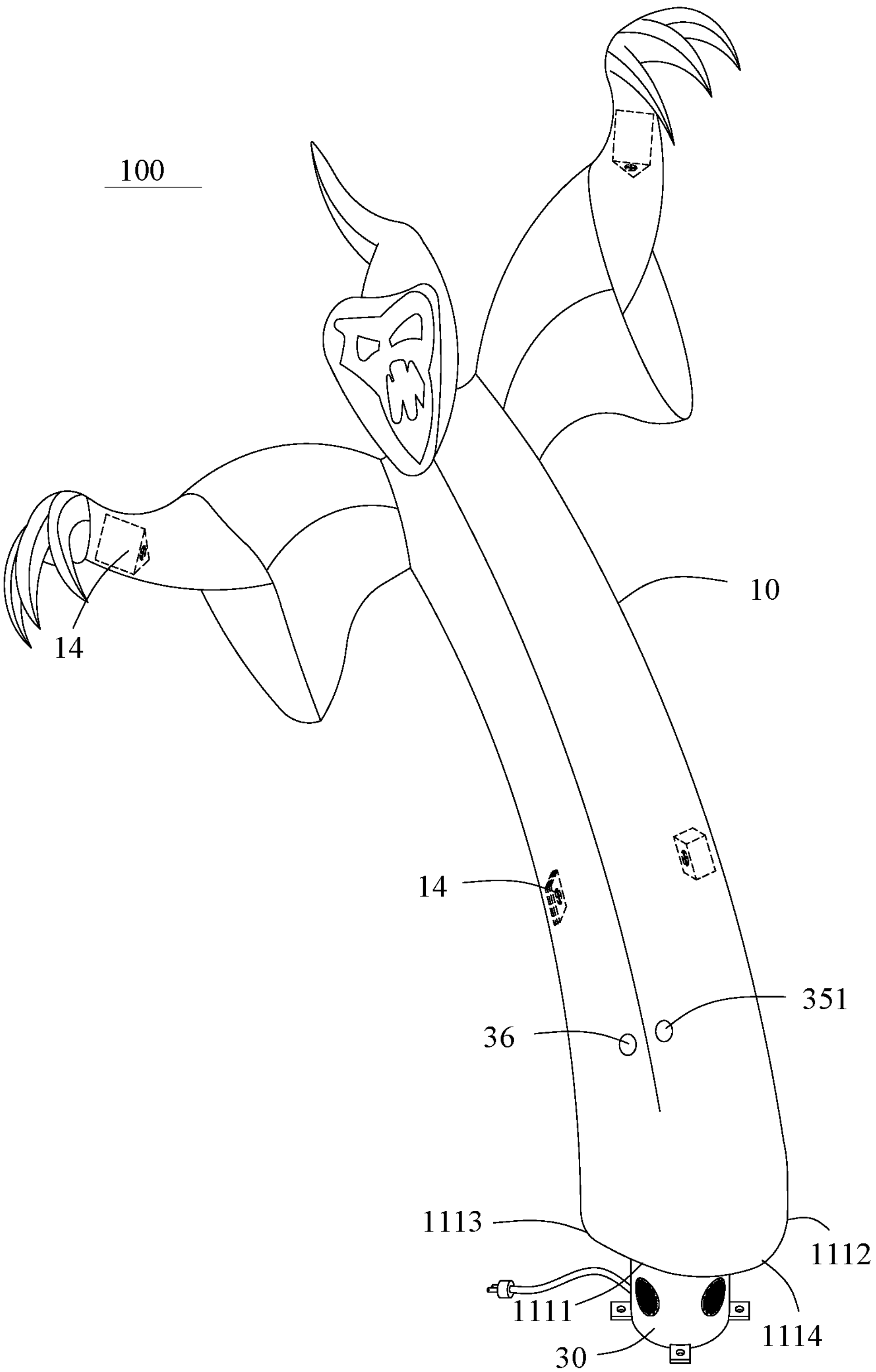
FIG. 3 is a structural schematic view of the inflatable doll of FIG. 1, wherein the inflatable doll twists to the left.
Figure 4:
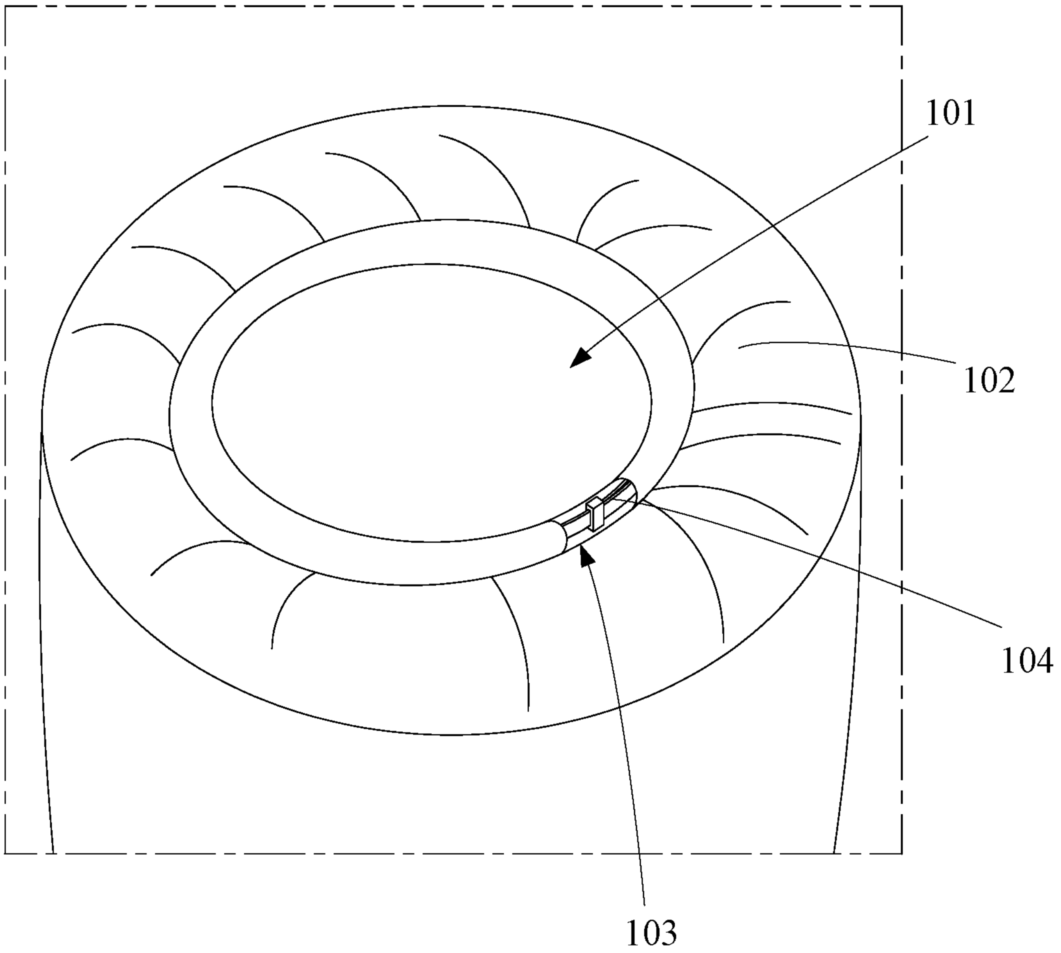
FIG. 4 is a structural schematic view of the bottom of the body and the connecting member of the inflatable doll of FIG. 1.
Figure 5:
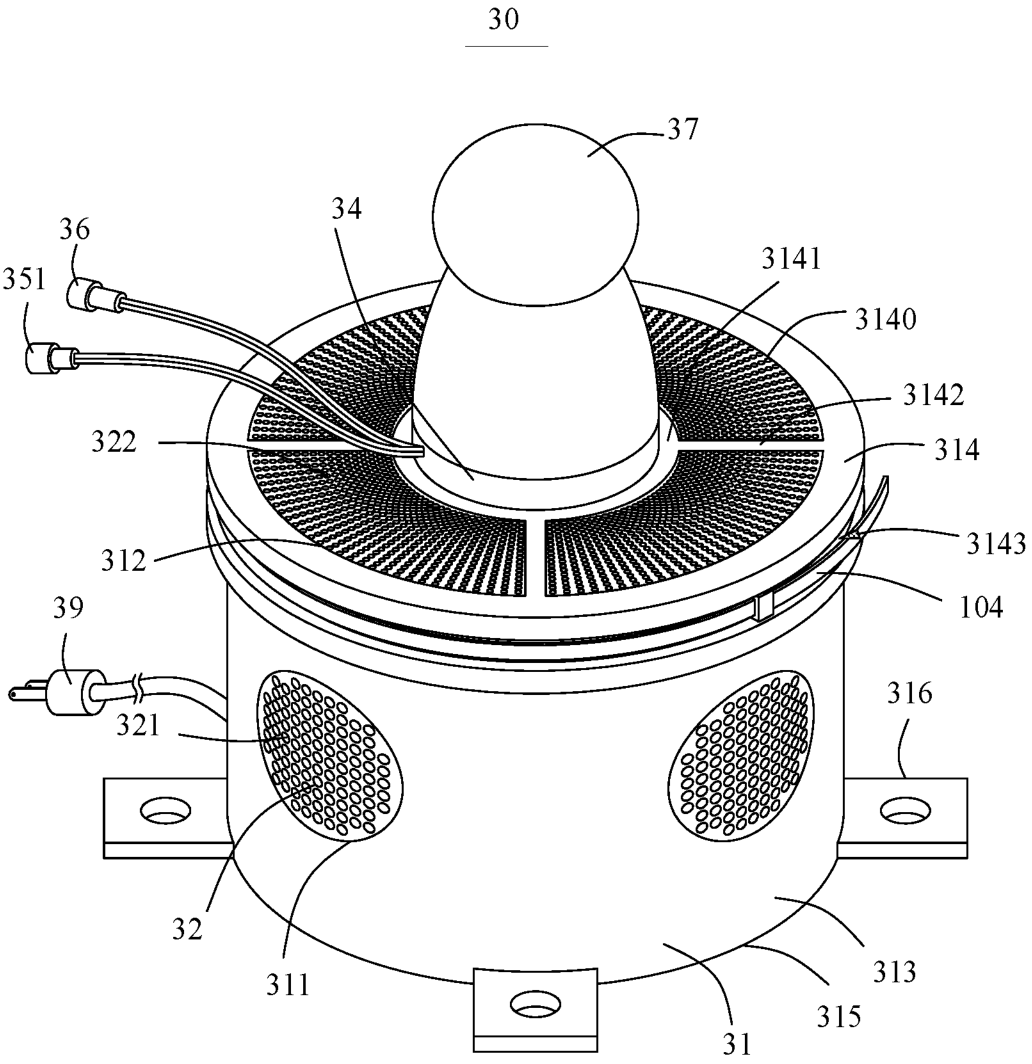
FIG. 5 is a structural schematic view of the accessory of the inflatable doll of FIG. 1.
Figure 6:
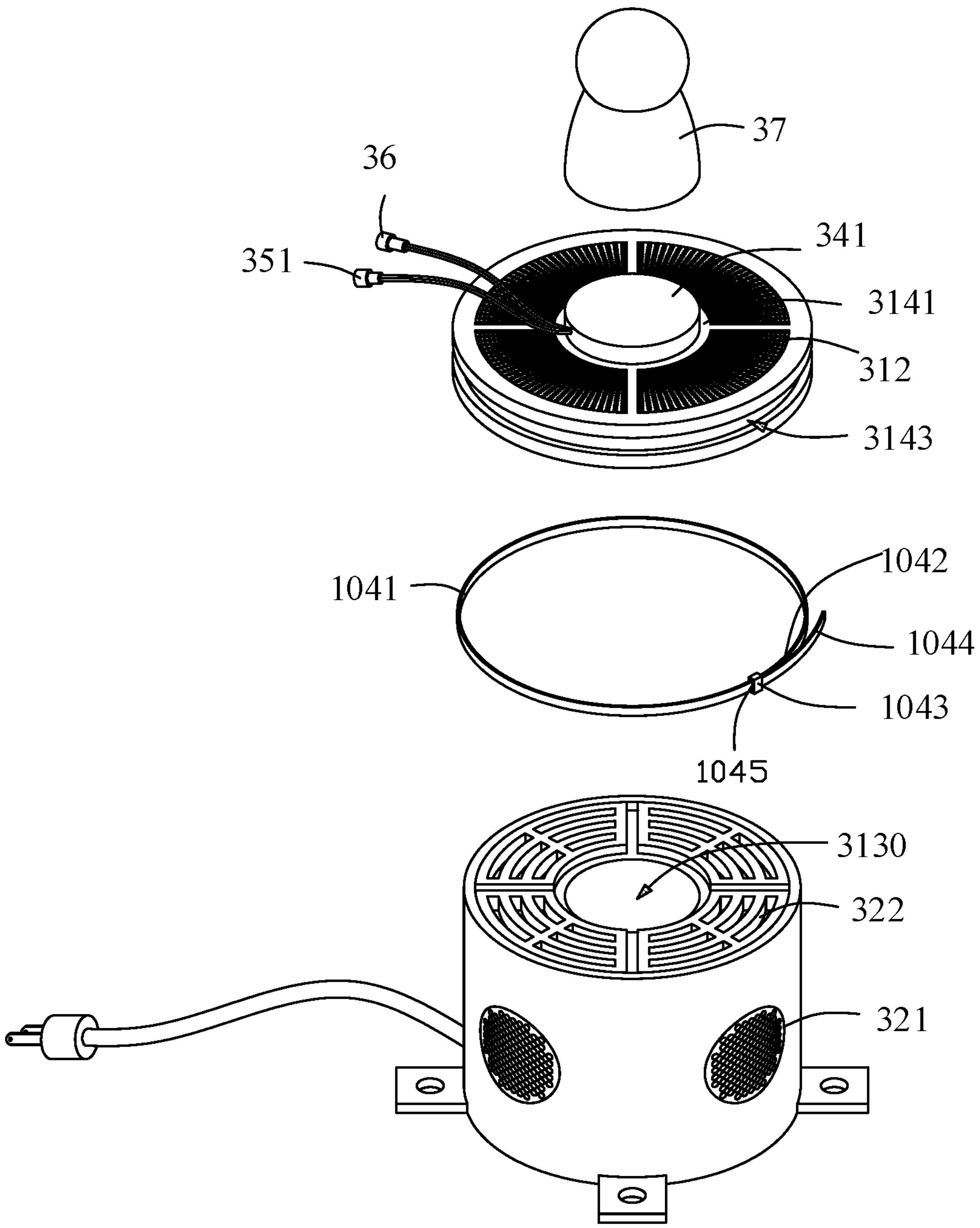
FIG. 6 is an exploded view of the accessory in FIG. 5.
Figure 7:
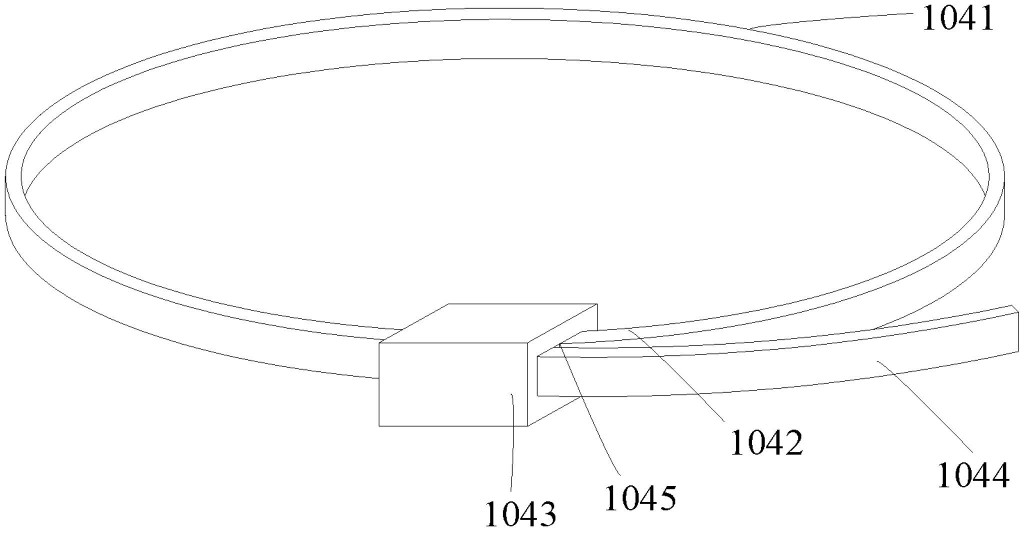
FIG. 7 is a structural schematic view of the connecting member in FIG. 6.
Figure 8:
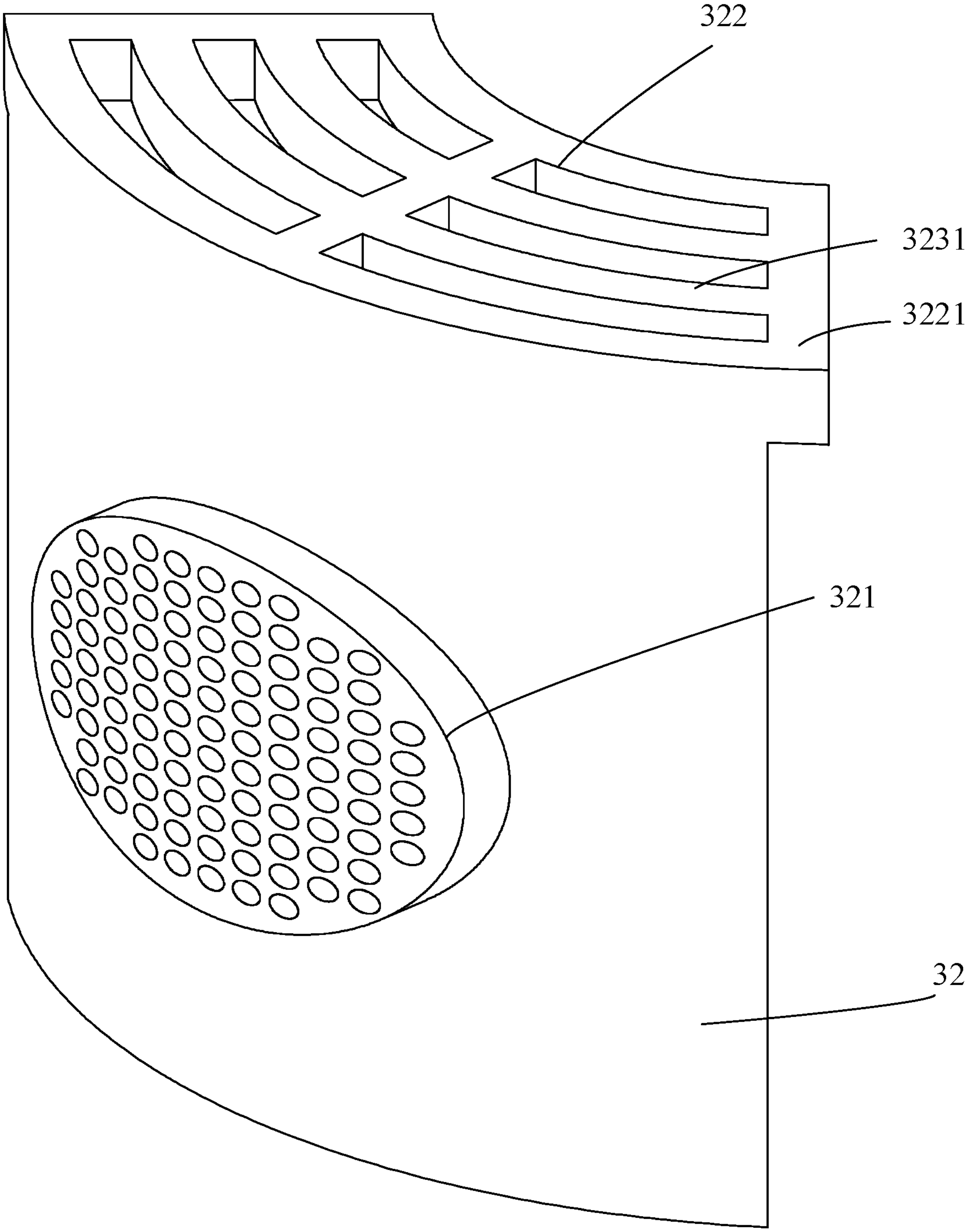
FIG. 8 is a structural schematic view of the first air blower in FIG. 6 according to an embodiment.
Figure 9:
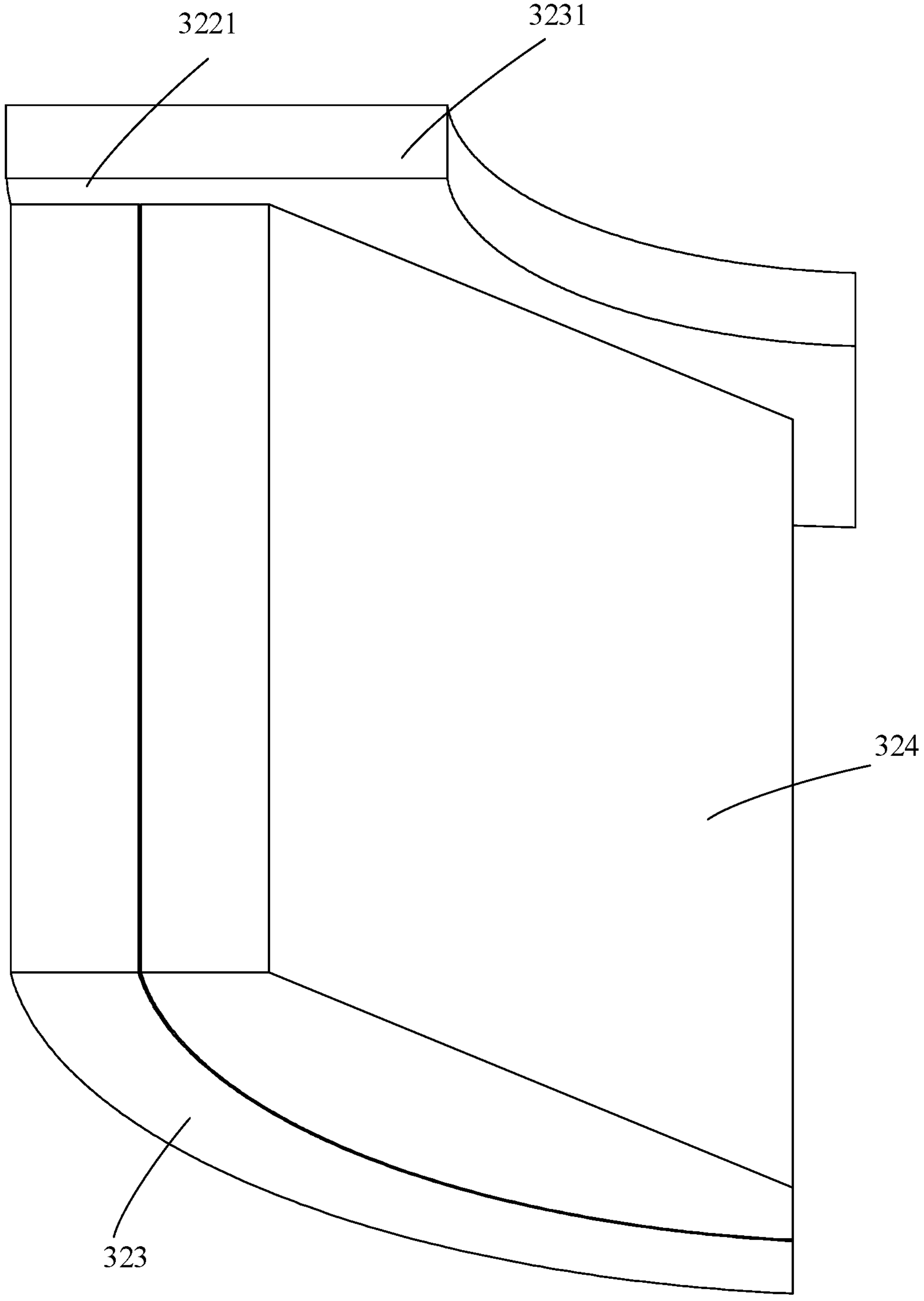
FIG. 9 is another structural schematic view of the first air blower in FIG. 8.
Figure 10:
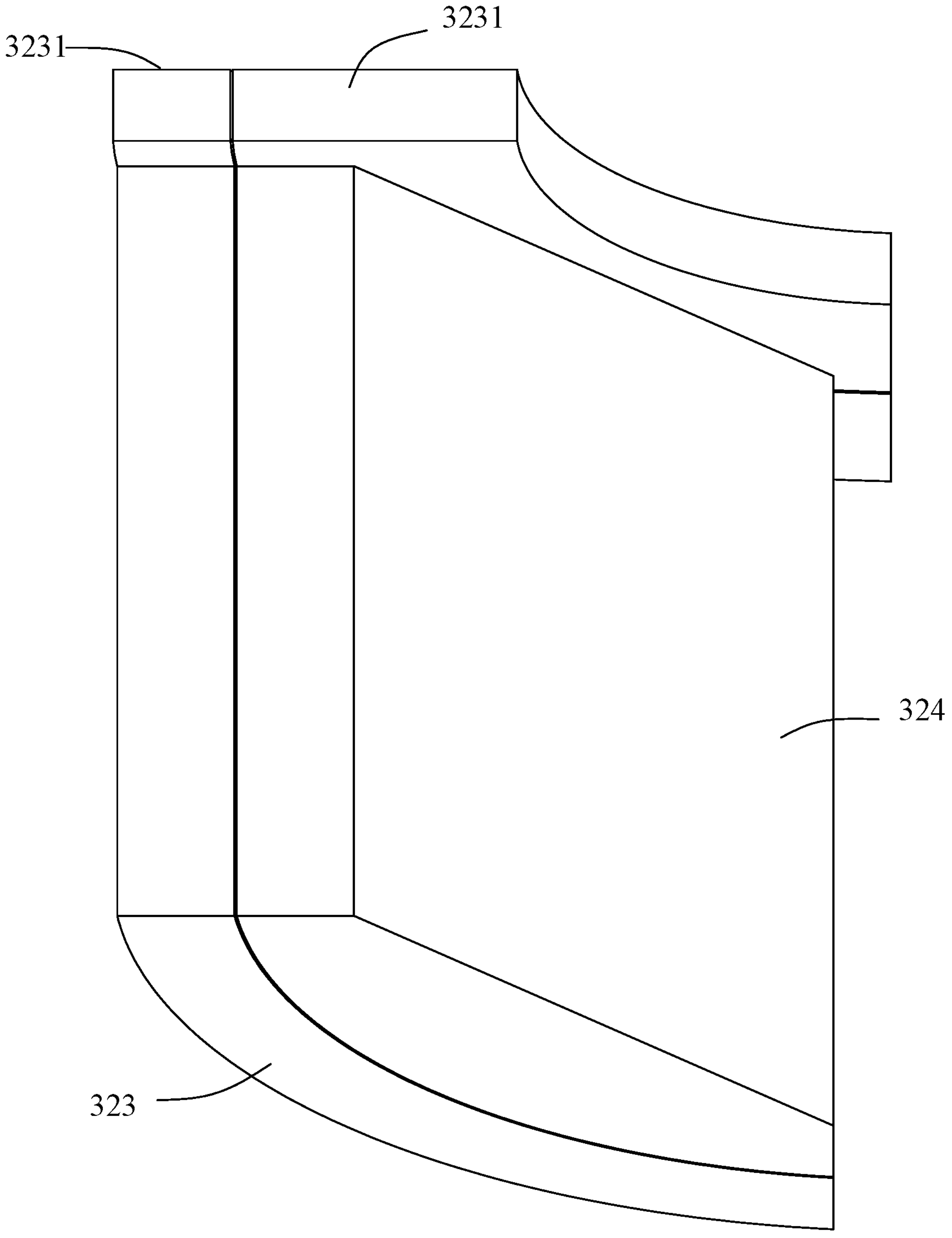
FIG. 10 is a structural schematic view of the first air blower in FIG. 6 according to another embodiment.
Figure 11:
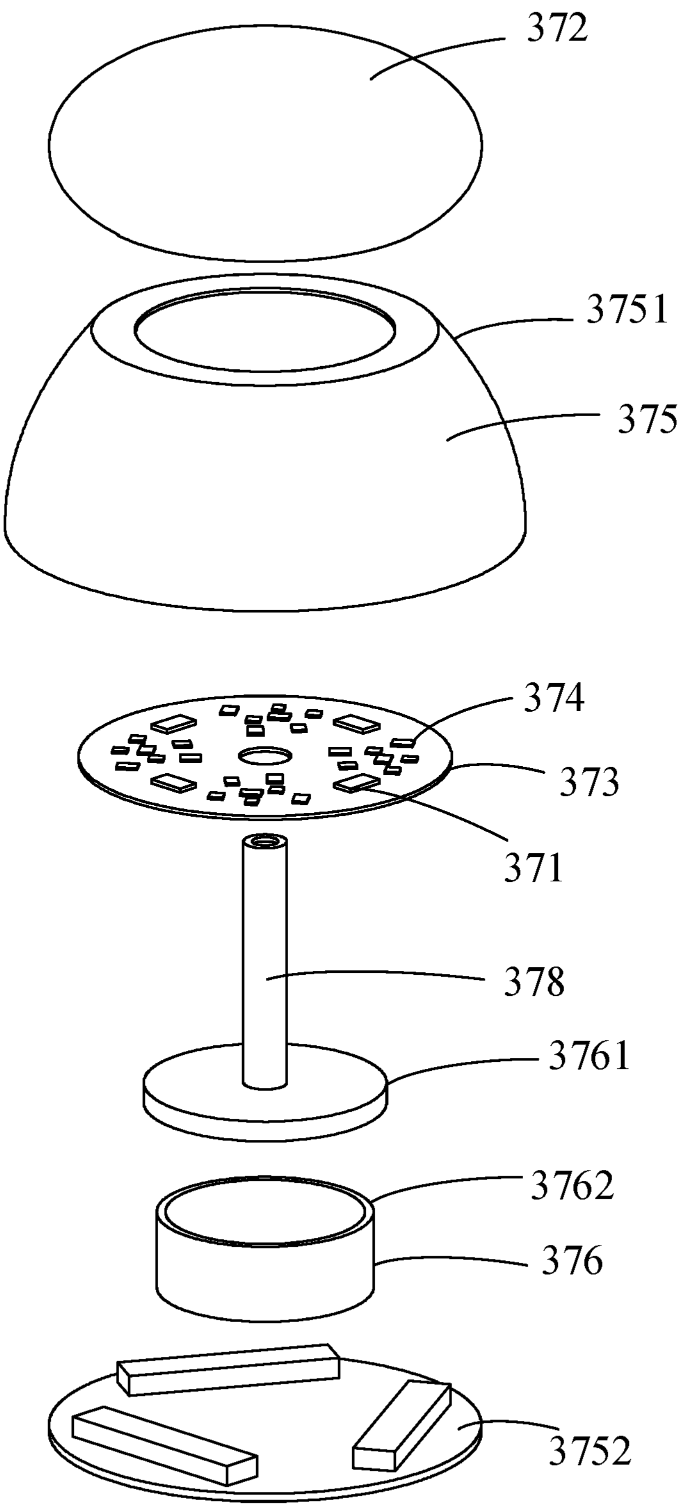
FIG. 11 is an exploded view of the lamp in FIG. 6.
Figure 12:
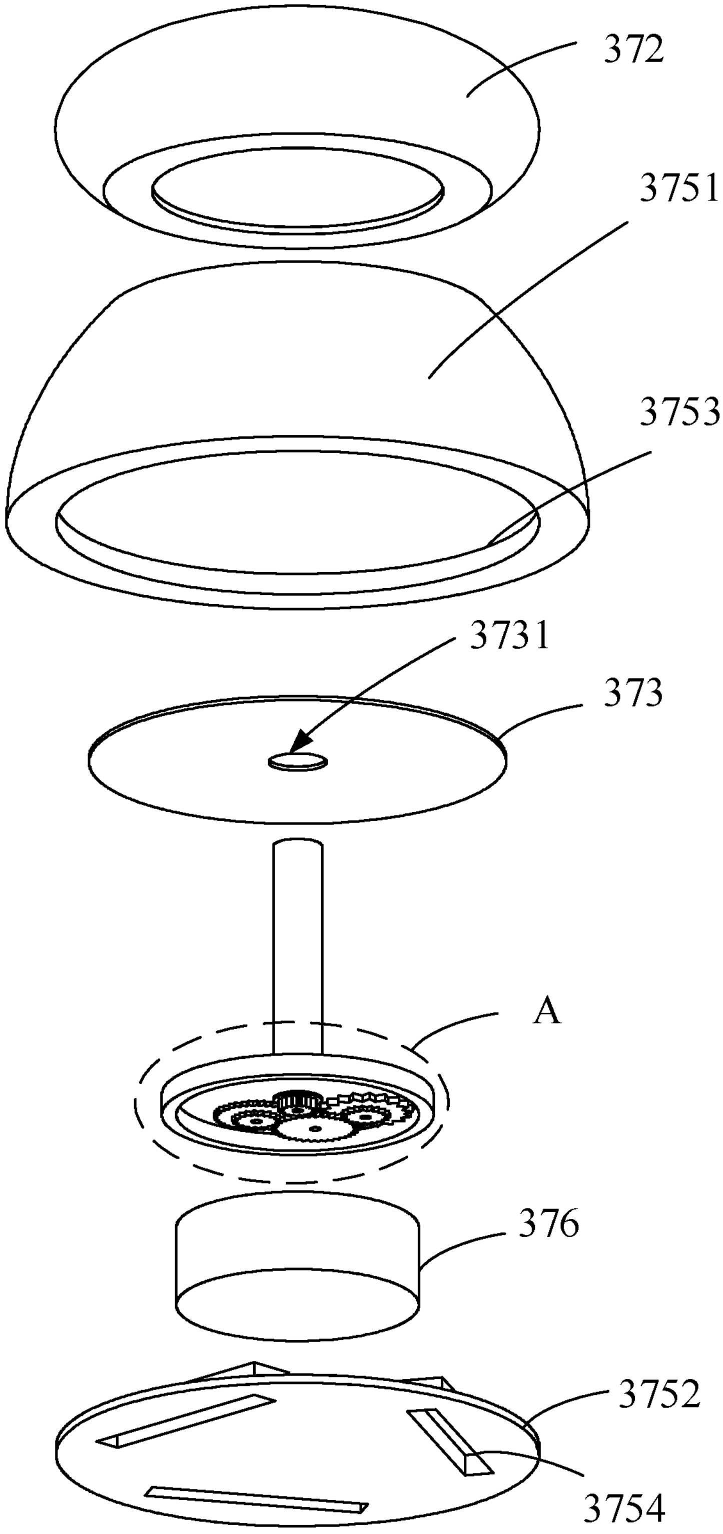
FIG. 12 is another exploded view of the lamp in FIG. 6.
Figure 13:
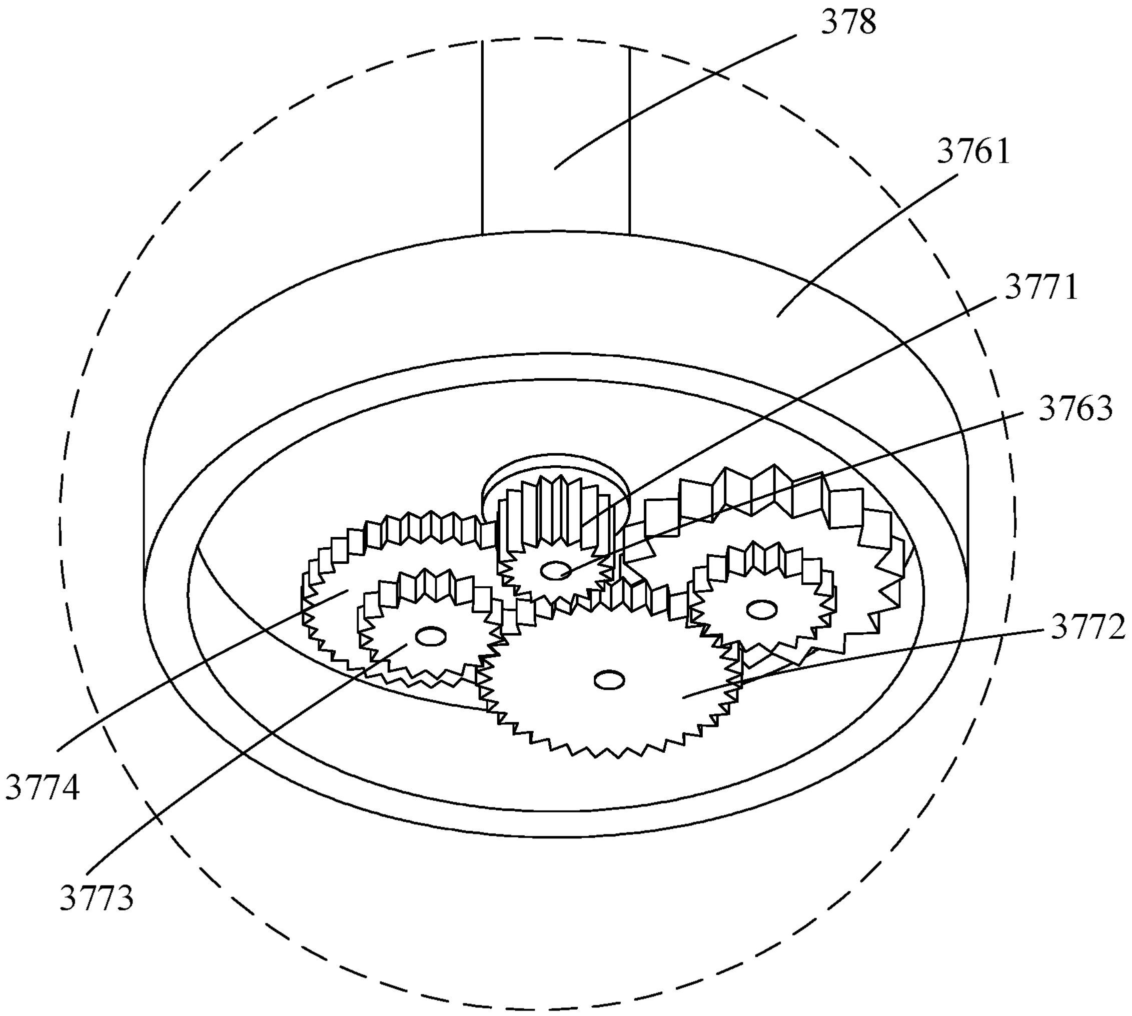
FIG. 13 is an enlarged view of portion A in FIG. 12.
Figure 14:
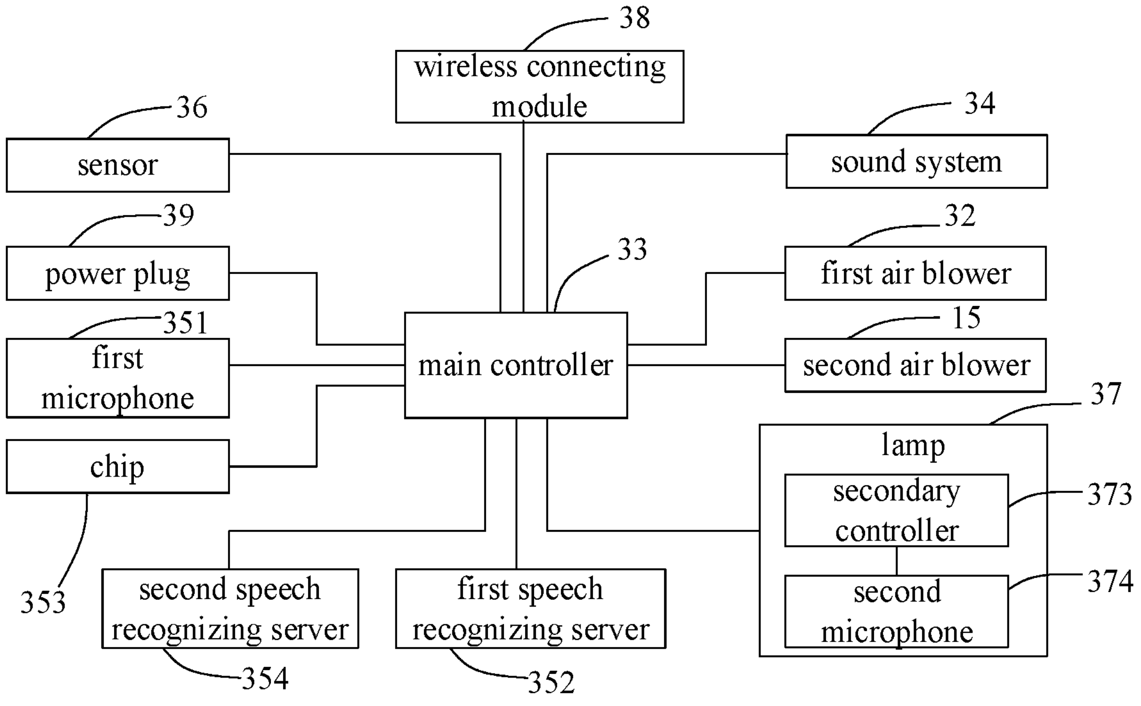
FIG. 14 is a structural block diagram of the inflatable doll in FIG. 1.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Referring to FIGS. 1-21, the present disclosure provides an inflatable doll 100 according to an embodiment. The inflatable doll 100 includes a body 10 with a cavity 11 and an accessory 30 connected with the body 10. The accessory 30 includes a housing 31, a plurality of first air blowers 32, and a main controller 33, and the housing 31 is used to mount the first air blowers 32 and the main controller 33. The housing 31 includes a first air inlet portion 311 and a first air outlet portion 312, the first air inlet portion 311 and the first air outlet portion 312 are both communicated with the cavity 11. The first air blowers 32 are at least partially mounted in the housing 31, and each first air blower 32 includes a second air inlet portion 321 and a second air outlet portion 322, and the second air inlet portion 321 and the second air outlet portion 322 are both communicated with the cavity 11, the second air inlet portion 321 of each first air blower 32 is communicated with the first air inlet portion 311, the second air outlet portion 322 of each first air blower 32 is communicated with the first air outlet portion 312. The main controller 33 is accommodated in the housing 31, the main controller 33 has an integrated circuit, and is electrically connected with the first air blowers 32 and configured to control at least one first air blower 32 of first air blowers 32 to direct air into the cavity 11 through the first air outlet portion 312 and the second air outlet portion 322. Under the control of the main controller 33, at least one first air blower 32 of the first air blowers 32 can work independently, and at least two first air blowers 32 of the first air blowers 32 can work simultaneously or independently. The accessory 30 further includes a power plug 39 arranged on the housing 31, the power plug 39 is electrically connected with the main controller 33, and the power plug 39 can be connected to an external power source to supply power to the first air blowers 32 and the main controller 33.

The body 10 includes a main part 12 and a secondary part 13 connected and communicated with the main part 12. In one embodiment, the inflatable doll 100 is a ghost doll, the main part 12 includes head, neck, abdomen, and legs, etc., and the secondary part 13 includes hands, arms, sleeves, etc. In other embodiments, the inflatable doll 100 may be a dinosaur doll, a human doll, a car doll, a rabbit doll, and so on.

The main controller 33 can control the first air blowers 32 to start or stop simultaneously, and can control at least one of the first air blowers 32 to work independently, and can also control at least two of the first air blowers 32 to work independently or simultaneously. For example, the main controller 33 can control one of the first air blowers 32 to start, and control another one of the first air blowers 32 to stop. The body 10 is disposed on the accessory 30, and the first air blowers 32 inflate the cavity 11 of the body 10 to make the body 10 expand and stand upright. The main controller 33 can control at least one of the first air blowers 32 to start to inflate the body 10. The main controller 33 can also control all of the first air blowers 32 to start simultaneously, so as to improve the inflation efficiency. The main controller 33 can control at least one first air blower 32 of the first air blowers 32 to stop, and the portion of the body 10 corresponding to the at least one first air blower 32 is deflated and deformed, and the main controller 33 can further control the at least one first air blower 32 of the first air blowers 32 to start working, and the portion of the body 10 corresponding to the at least one first air blower 32 is inflated and deformed again, the inflation and deflation operations are repeated, and the inflatable doll 100 can move dynamically. different positions of the housing 31 in a circumferential direction of the housing 31, the bottom of the body 10 is arranged on the accessory 30, such that the first air blowers 32 are also arranged corresponding to different portions of the bottom of the body 10. In one embodiment, the first air blowers 32 include a front first air blower located in a front portion of the housing 31, a rear first air blower located in a rear portion of the housing 31, a left first air blower located in a left portion of the housing 31, and a right first air blower located in a right portion of the housing 31, the front first air blower corresponds to the front portion 1111 of the body 10, the rear first air blower corresponds to the rear portion 1112 of the body 10, and the left and right first air blowers correspond to the left portion 1113 and the right portion 1114 of the body 10 respectively. When the inflatable doll 100 needs to perform actions such as dancing, the main controller 33 controls the front first air blower to stop working, and the air in the front portion 1111 of the body 10 flows out and the front portion 1111 of the body 10 deforms; then the controller 33 controls the front first air blower to start working again, so as to direct air into the front portion 1111 of the body 10, and the front portion 1111 of the body 10 deforms again; the main controller 33 controls the rear first air blower, the left first air blower, and the right first air blower to stop working or start working; the main controller 33 controls the first air blowers 33 to stop working and start working repeatedly, and the inflatable doll 100 can act dynamically to attract customers. Under the control of the main controller 33, the inflatable doll 100 can move left and right, move up and down, move forward and backward, twist, shake, nod, etc., and these actions can be symmetrical or asymmetrical. According to the actual needs, the body 10 can perform the above actions under the action of the main controller 33.

The body 10 is made of flexible material which can be inflated to expand and erect to a prearranged configuration and can also be deflated to perform different attractive actions. In detail, the body 10 is made of air-tight cloth, air-tight fabric, rubber, polyphthalamide, thermoplastic urethanes (TPU), polyphenylenesulfide-based fiber (PPS), polyetheretherketone-based fiber (PEEK), nylon, and the like wholly aromatic polyamide fiber, wholly aromatic polyester fiber, polyimide-based fiber, polyetherimide-based fiber, vinylon-based fiber, acrylic-based fiber, cellulose-based fiber, silicon carbide-based fiber, alumina-based fiber, glass-based fiber, carbon-based fiber, steel-based fiber, and the like. The body 10 may also be transparent or translucent.

The housing 31 includes a side wall 313, a top cover 314, and a bottom wall 315, and the side wall 313, the top cover 314 and the bottom wall 315 cooperatively form a receiving space 3130 for receiving the first air blowers 32 and the main controller 33. In one embodiment, the housing 31 may not have the bottom wall 315. The top cover 314 is detachably connected to the side wall 313, making it easy to change components in the housing 31. At least one fixing element 316 is arranged on the side wall 313 and/or the bottom wall 315, and the housing 31 is fixed on a platform such as the ground by the fixing element 316. The housing 31 can be in a regular shape or an irregular shape, and the regular shape includes cylinder, cuboid, cube, hexahedron, octahedron, and the like. The top cover 314 and the bottom wall 315 have shapes corresponding to the side walls 313. The side wall 313 defines the first air inlet portion 311. In one embodiment, the first air inlet portion 311 is a through hole which is opened in a circumferential direction of the side wall 313, and the through hole corresponds to the second air inlet portions 321, such that the air can flow into the body 10 smoothly, the through hole does not need to pass through the side wall 313 completely in the circumferential direction to divide the side wall 313 into two independent parts. In another embodiment, the first air inlet portion 311 includes a plurality of through holes spaced apart from each other, and each through hole corresponds to one corresponding second air inlet portion 321. In a further embodiment, the first air inlet portion 311 includes a plurality of mesh structures, each mesh structure defines at least one through hole, and each mesh structure corresponds to one corresponding second air inlet portion 321.

The first air outlet portion 312 and the second air outlet portion 322 are integrally formed in one body, or the first air outlet portion 312 is detachably connected with the second air outlet portion 322. The second air outlet portion 322 of the first air blower 32 is matched with the first air outlet portion 312 of the housing 31 in shape, the second air outlet portion 322 of the first air blower 32 and the first air outlet portion 312 of the housing 31 have a regular shape or an irregular shape, and the regular shape includes a fan shape, a round shape, a square shape, an oval shape, or a hexagonal shape. The shape of the second air outlet portion 322 is arranged to match with the shape of the first air outlet portion 312, not only to acquire smooth deflation and inflation processes and improve deflation and inflation efficiencies, but also to enable the portion of the body 10 corresponding to the first air blower 32 to deform much more quickly and accurately. It should be understood that, the shape of the second air outlet portion 322 is arranged to match with the shape of the first air outlet portion 312, the deflation and inflation processes of each portion of the body 10 corresponding to the first air blower 32 will not be affected by the different shapes of the first air outlet 312 and the second air outlet 322, so as to improve the deformation accuracy of each portion of the body 10.

The housing 31 is provided with a plurality of first air blowers 32, specifically two to ten first air blowers 32, preferably four to eight first air blowers 32. The first air blowers 32 are disposed in the receiving space 3130 at intervals. In one embodiment, the housing 31 is in a hexahedron shape, and the side wall 313 has six surfaces correspondingly, each surface of the side wall 313 defines a through hole 3131, six first air blowers 32 are received in the receiving space 3130, and each first air blower 32 is communicated with or received in one corresponding through hole 3131. In another embodiment, the housing 31 is in a cylinder shape, the side wall 313 is in a circular shape correspondingly, the side wall 313 defines four through holes 3131 spaced apart from each other, four first air blowers 32 are received in the housing 31, and each first air blower 32 is communicated with or received in one corresponding through hole 3131. The shape of the housing 31 and the number of the first air blowers 32 can be set according to actual needs.

Each first air blower 32 includes a first casing 323 and a second casing 324, the first casing 323 is connected with the second casing 324 to form an accommodating space (not shown), components (not shown) configured to realize the function of directing air into the cavity 11, such as impeller, bracket, motor, pulley, coupling, muffler, bearing, etc., are accommodated in the accommodating space 3230. The first casing 323 defines the second air inlet portion 321, and the second air inlet portion 321 may be a through hole or a mesh structure with through holes.

The first casing 323 can be integrally formed with the first air inlet portion 311, or the second air inlet portion 321 of the first casing 323 can be integrally formed with the first air inlet portion 311, and the second casing 324 is detachably connected with the first casing 323, to facilitate the preparation of the first casing 323 and the installation of the second casing 324 and the above described components. When the above described components need to be replaced, user can disassemble the second casing 324 from the first casing 323 for replacement. In another embodiment, the first casing 323 is detachably connected with the first air inlet portion 311, When the above described components need to be replaced, user can disassemble the first casing 323 from the first air inlet portion 311 for replacement.

The first casing 323 and/or the second casing 324 includes a protruding portion 3231. In one embodiment, referring to FIGS. 8 and 9, the first casing 323 has the protruding portion 3231 which is protruded from the first casing 323 and the second casing 324, the protruding portion 3231 defines the second air outlet portion 322; in another embodiment, the second casing 324 has the protruding portion 3231 which is protruded from the first casing 323 and the second casing 324, the protruding portion 3231 defines the second air outlet portion 322; in a further embodiment, referring to FIG. 10, each of the first casing 323 and the second casing 324 have a protruding 3231, and the two protruding portions 3231 are detachably connected with each other, and the two protruding portions 3231 cooperatively define the second air outlet portion 322. The second air outlet portion 322 can be a through hole, or a mesh structure with at least one through hole. A periphery of the second air outlet portion 322 extends outwards to form a flange 3221, and the flange 3221 can be connected to an inner surface or an outer surface of the top cover 314. The second air inlet portion 321 and the second air outlet portion 322 are arranged in different directions. Specifically, the second air inlet portion 321 is arranged towards the side wall 321 and substantially perpendicular to an axial direction of the housing 31, the second air outlet portion 322 is arranged towards the top cover 314 and substantially parallel to the axial direction of the housing 31, and the second air inlet portion 321 is arranged substantially perpendicular to the second air outlet portion 322.

The top cover 314 defines the first air outlet portion 312. In one embodiment, the first air outlet portion 312 is a through hole, specifically, the through hole is defined along a circumferential direction of the top cover 314 and corresponds to the second air outlet portions 322, the air can flow into the body 10 through the first air outlet portion 312 smoothly, and the through hole does not need to pass through the top cover 314 completely in the circumferential direction to divide the top cover 314 into two independent parts. In another embodiment, the first air outlet portion 312 includes a plurality of through holes arranged at intervals, and each through hole corresponds to one corresponding second air outlet portion 322. In a further embodiment, the first air outlet portion 312 includes a plurality of mesh structures, each mesh structure defines at least one through hole, and each mesh structure corresponds to one corresponding second air outlet portion 322.

In one embodiment, the central area of the top cover 314 includes a mounting portion 3141, the first air outlet portion 312 surrounds the mounting portion 3141. When the first air outlet portion 312 includes through holes or mesh structures 3140, the through holes and the mesh structures 3140 are arranged around the mounting portion 3141, and each two adjacent through holes or each two adjacent mesh structures 3140 are separated by a connecting rib 3142, and the connecting rib 3142 is connected between the mounting portion 3141 and an edge of the top cover 314 to increase the strength of the top cover 314. The second air outlet portion 322 is received in the through hole or partially extended out of the through hole, or the second air outlet portion 322 is connected with the mesh structure 3140. The second air outlet portion 322 and the flange 3221 are flush with the outer surface of the top cover 314 or protruded out of the outer surface of the top cover 314. The top cover 314 and the mounting portion 3141 may be circular, and the through hole or the mesh structure 3140 may be fan-shaped. At this time, the second air outlet portion 322 may also be fan-shaped. It should be understood that the shapes of the top cover 314, the mounting portion 3141, the through hole and the mesh structure 3140 can be set according to actual needs.

The outer surface of the top cover 314 or the side wall 313 defines a groove 3143 which is defined along the circumference of the top cover 314 or the side wall 313. The body 10 defines a through hole 101. Specifically, the through hole 101 is defined in the bottom of the body 10 and communicated with the cavity 11. An edge of the through hole 101 crimps to form a receiving portion 102, and the receiving portion 102 defines a via hole 103. The receiving portion 102 can sleeve on the top cover 314 or the side wall 313 and fixed in the groove 3143 by a connecting element 104. A connecting element 104 can pass through the receiving portion 102 through the via hole 103, and securely fix the receiving portion 102 in the groove 3143. The connecting element 104 includes a connecting strip 1041, a fixing portion 1043 connected with the first end 1042 of the connecting strip 1041, the connecting strip 1041 is accommodated in the receiving portion 102 and surrounds around the bottom wall of the groove 3143, the second end 1044 of the connecting strip 1041 is inserted into a through hole 1045 of the fixing part 1043, to fix the receiving part 102 in the groove 3143.

The accessory 30 further includes a sound system 34 (which may be a stereo, a speaker, a loudspeaker, or the like) and a first sound collecting member 351 (which may be a microphone, a sound pick-up, or the like) electrically connected with the main controller 33. The sound system 34 is mounted on the mounting portion 3141, and the present disclosure does not limit the method for mounting the sound system 34 on the mounting portion 3141, the sound system 34 can be detachably or fixedly mounted on the mounting portion 3141, the sound system 34 can also glued on the mounting portion 3141. The first sound collecting member 351 is configured to collect the sound emitted from the sound system 34 and transmit a sound signal to the main controller 33, and the main controller 33 controls the operation of at least one first air blower 32 of the first air blowers 32 according to the sound signal. Specifically, the sound system 34 can play a variety of music with different rhythms, the first sound collecting member 351 collects the sound continuously or intermittently and transmits the sound signals to the main controller 33 continuously or intermittently, and the main controller 33 controls the operation of at least one first air blower 32 in the first air blowers 32 according to the rhythm information in the sound signals, such that the inflatable doll 100 can perform actions according to the rhythms of the music and move rhythmically.

The first sound collecting member 351 can also collect human voice and send the voice signal to the main controller 33. It should be understood that, the first sound collecting member 351 can also collect voices of robots or voices of other animals such as parrots, and send voice signals to the main controller 33. The accessory 30 further includes a first speech recognizing server 352, a chip 353, and a second speech recognizing server 354. The first speech recognizing server 352 is electrically connected with the main controller 33, and configured for recognizing the speech signal processed by the main controller 33 and sending a recognition result to the main controller 33. The chip 353 is electrically connected with the main controller 33 and pre-stores vocabularies, and configured for sending a first feedback containing text information to the main controller 33 according to the vocabularies and recognition result. The second speech recognizing server 354 is electrically connected with the main controller 33 and configured for sending a second feedback containing a sound signal to the sound system 34, such that the accessory 30 can communicate with the user. The main controller 33 can send instructions to the first air blower 32 and/or sound system 34 according to the voice signal to control the operation of the first air blower 32 and/or sound system 34.

Specifically, the main controller 33 processes the voice signal, and sends the processed voice signal to the first speech recognizing server 352, and the first speech recognizing server 352 recognizes the processed voice signal and sends the recognition result to the main controller 33. The main controller 33 sends the recognition result to the chip 353, and then the chip 353 sends the first feedback containing text information to the main controller 33 according to the vocabularies and the recognition result. The main controller 33 sends the first feedback to the second speech recognizing server 354, and the second speech recognizing server 354 sends the second feedback containing the sound signal to the sound system 34, so as to communicate with the user.

The accessory 30 further includes a sensor 36 for sensing whether someone enters into a sensing area of the sensor 36. The sensor 36 sends a sensing signal to the main controller 33 when sensing that someone enters into the sensing area, and the main controller 33 controls the sound system 34 to play voice information according to the received sensing signal. In this way, the inflatable doll 100 can communicate with the user, or the user can be guided to communicate with the inflatable doll 100. The voice information includes greeting, self-introduction, music, news, etc.

When the user in the sensing area tells the inflatable doll 100 that he wants the inflatable doll 100 to tell a story, the main controller 33 controls the sound system 34 to tell the story according to the communication with the user. After receiving the sensing signal, the main controller 33 can also control the operation of at least one first air blower 32 of the first air blowers 32 according to the communication with the user. For example, when the user in the sensing area tells the inflatable doll 100 that he wants the inflatable doll 100 to dance, the main controller 33 controls the operations of the first air blowers 32 according to the communication with the user, such that the inflatable doll 100 can dance.

The inflatable doll 100 can also act on its own initiative, such as greeting automatically. When sensing that someone enters into the sensing area, the sensor 36 sends the sensing signal to the main controller 33, and the main controller 33 controls the operation of at least one first air blower 32 of the first air blowers 32 according to the received sensing signal. Specifically, when sensing that someone enters into the sensing area, the sensor 36 sends the sensing signal to the main controller 33, and the main controller 33 controls the front first air blower to stop working according to the received sensing signal, the air in the front portion of the body 10 flows out, and the front portion of the body 10 deforms, such that the inflatable doll 100 bows to pay respect; or the main controller 33 controls the left first air blower 32 to stop working, after the inflatable doll 100 bends to the left, the left first air blower 32 is controlled to start working, the inflatable doll 100 stands upright again, then the right second air blower 32 is controlled to stop working, after the inflatable doll 100 bends to the right, the right first air blower 32 is controlled to start working, and the inflatable doll 100 stands upright again; repeatedly, the inflatable doll 100 swings to attract customers.

The accessory further includes a lamp 37 arranged on the sound system 34. The lamp 37 may be a LED lamp, an atmosphere lamp, a fluorescent lamp, or an electrodeless lamp. The lamp 37 is arranged on the sound system 34 and located at the top portion of the accessory 30 to avoid an interference of the other components of the accessory 30 to the lamp 37. The lamp 37 includes at least one illuminating part 371, a lampshade 372 covered on the at least one illuminating part 371, a secondary controller 373 configured to control the at least one illuminating part 371, a second sound collecting member 374 (which may be a microphone, a sound pick-up, or the like), and a lamp housing 375, the lamp housing 375 is configured to accommodate the at least one illuminating part 371, the lampshade 372, the secondary controller 373 and the second sound collecting member 374. The secondary controller 373 is electrically connected with the main controller 33 and the power plug 39. The main controller 33 can send instructions to the lamp 37 to control the operation of the lamp 37 according to the communication with the user. In one embodiment, when user tells the inflatable doll 100 to turn on the lamp 37, the main controller 37 turns on the lamp 37 by the secondary controller 373. The sound system 34 includes an outer housing 341 and a speaker unit (not shown) accommodated in the outer housing 341, and the outer housing 341 is detachably or fixedly mounted on the mounting portion 3141. The lamp housing 375 is arranged on the outer housing 341. The outer housing 341 defines a first via hole, and the mounting portion 3141 also defines a second via hole, and wires of the sensor 36 and the first sound collecting member 351 can pass through the first via hole (not shown) and the second via hole (not labeled) to electrically connect with the main controller 33. The body 10 of the inflatable doll 100 defines two mounting holes 1001, and the sensor 36 and the first sound collecting member 351 are respectively mounted in the mounting holes 1001 and exposed from the inflatable doll 100.

Each illuminating part 371 can emit white light, colored light, flashing light, etc. Different illuminating parts 371 can emit light of different colors or light of different types. Preferably, the lamp 37 is an atmosphere lamp. An ambient light is formed after the light emitted by the illuminating part 371 passing through the transparent or translucent lampshade 372, the ambient light can render the atmosphere in the body 10. The lampshade 372 can be replaced to acquire different lighting effects, such as starry sky lighting effect, flame lighting effect, animal lighting effect, etc.

The second sound collecting member 374 is disposed adjacent to the sound system 34, in this way the sound collected by the second sound collecting member 374 is accurate. Even when the inflatable doll 100 is in a noisy environment, the second sound collecting member 374 can still collect accurate sound signal from the sound system 34. In detail, the second sound collecting member 374 is received in the lamp housing 375 and adjacent to the sound system 34. The second sound collecting member 374 collects the sound from the sound system 34 and transmits the sound signal to the secondary controller 373, and the secondary controller 373 controls the operation of the at least one illuminating part 371 according to the sound signal. In one embodiment, the secondary controller 373 can turn on or off the lamp 37 according to the sound signal, can control at least one of the illuminating parts 371 to work independently according to the sound signal, and can also control at least two of the illuminating parts 371 to work independently or simultaneously according to the sound signal. In another embodiment, the secondary controller 373 can control the number of the illuminating part 371 in operation according to the sound signal, and control the intensity and lighting time of the light emitted from the illuminating part 371. So that the lighting effect can follow the rhythm of the sound from the sound system 34. Specifically, when the sound stops, the illuminating part 371 stops working; when the sound gets stronger gradually, the light intensity of the light emitted from the illuminating part 371 also gets stronger gradually, or the number of the illuminating part 371 in operation increases gradually; when the rhythm of the sound changes, the illuminating parts 371 which can emit different coloured light are turned on alternately, or the type of the light emitted from the illuminating parts 371 changes accordingly. So that, the light effect matches with the rhythm of the sound.

The lamp housing 375 includes a support housing 3751 for supporting the lampshade 372, and a base 3752. The base 3752 is disposed on the outer housing 341 of the sound system 34. An upper end of the support housing 3751 has a step 3753 for supporting the secondary controller 373. The illuminating part 371 is disposed on an upper surface of the secondary controller 373. The second sound collecting member 374 is arranged on a lower surface of the secondary controller 373, or arranged on the support housing 3751 or the base 3752. So that, the second sound collecting member 374 is arranged adjacent to the sound system 34.

The driving member 376 is arranged below the secondary controller 373, and the driving member 376 is a motor or the like. The driving member 376 is arranged in the support housing 3751 and supported by the base 3752, or arranged at the lower surface of the secondary controller 373. In one embodiment, the driving member 376 includes an upper housing 3761, a lower housing 3762, an output shaft 3763 and a gear set 3764, the driving member 376 is connected to the secondary controller 373 by the upper housing 3761 which is connected with the lower surface of the secondary controller 373. The gear set 3764 is arranged in the upper housing 3761 or the lower housing 3762. The center portion of the secondary controller 373 defines a through hole 3731, the illuminating parts 371 surround the through hole 3731, and a connecting rod 378 passes through the through hole 3731 and connects with the lampshade 372. In one embodiment, the gear set 3764 includes a first gear 3771 (the first gear 3771 can also be a connecting element which does not have the teeth and connects the connecting rod 378 with the output shaft 3763) sleeved on the output shaft 3763, the first gear 3771 connects the connecting rod 378 with the output shaft 3763, the driving member 376 can rotate the connecting rod 378 and the lampshade 372 to improve the light effect; in another embodiment, the gecith the third gear 3773, in this way, the driving member 376 can rotate the connecting rod 378 and the lampshade 372, to improve the lighting effect. At least one of the first gear 3771, the second gear 3772 and the third gear 3773 is supported by a support rod (not labeled) or a fourth gear 3774 and has a certain height, to facilitate transmission of force.

At least one accommodating portion 3754 is defined on the upper surface or the lower surface of the base 3752, and at least one battery (not shown) is accommodated in the accommodating portion 3754 to supply power to the driving member 376. The battery may be a disposable battery or a rechargeable battery. When the battery is the rechargeable battery, the battery can be connected with the main controller 33, and connected with an external power source by the main controller 33 and the power plug 39.

The accessory 30 further includes a wireless connecting module 38 electrically connected with the main controller 33, the wireless connecting module 38 is wirelessly connected to the mobile device of the user and configured to transmit the instructions of the user by APP in the mobile device to the main controller 33.

The inflatable doll 100 further includes at least one expandable member 14 and at least one second air blower 15 electrically connected with the main controller 33. The at least one second air blower 15 is arranged on the at least one expandable member 14 for directing the air in the at least one expandable member 14 into the cavity 11. The expandable member 14 is connected with the main part 12 and/or the secondary part 13 by means of sewing or gluing. The expandable member 14 is expandable, flexible or deformable, and capable of expanding or contracting under an action of the second air blower 15. The expandable member 14 defines a through hole 141 communicated with the cavity 11, the air in the body 10 can flow into the expandable member 14 automatically to inflate the expandable member 14. Under the action of the second air blower 15, the expandable member 14 deflates and deforms to move the main part 12 and/or the secondary part 13.

The expandable member 14 is made of flexible material which can be inflated to expand and erect to a prearranged configuration and can also be deflated to perform different attractive actions. In detail, the body 10 is made of air-tight cloth, air-tight fabric, rubber, polyphthalamide, thermoplastic urethanes (TPU), polyphenylenesulfide-based fiber (PPS), polyetheretherketone-based fiber (PEEK), nylon, and the like wholly aromatic polyamide fiber, wholly aromatic polyester fiber, polyimide-based fiber, polyetherimide-based fiber, vinylon-based fiber, acrylic-based fiber, cellulose-based fiber, silicon carbide-based fiber, alumina-based fiber, glass-based fiber, carbon-based fiber, steel-based fiber, and the like. The expandable member 14 may also be transparent or translucent.

The first air blower 32 and the second air blower 15 are intermittently actuated air blowers. An air drafting capability of the second air blower 15 is lower in pressure than that of the first air blower 32. The first air blower 32 has a power of about 5-300 W, preferably 110-300 W; and the second air blower 15 has a power of about 5-100 W, preferably 20-50 W. The power of each of the first air blower 32 and the second air blower 15 may be set according to actual needs, so as to adjust the deflation rate of the body 10 and the expandable member 14, further to adjust a deformation rate of the primary part 11 and/or the secondary part 13.

The first air blower 32 directs the air into the body 10 to inflate the body 10 and the expandable member 14 and move the body 10. The second air blower 15 discharges the air from the expandable member 14, the expandable member 14 deforms to move the body 10. The air in the body 10 flows back into the expandable member 14, the expandable member 14 expands and deforms to move the body 10 again. It should be understood that the expandable member 14 can be arranged in different portions of the body 10 as required, for example, the expandable members 14 are arranged in the hand, arm, mouth, hat, leg of the ghost doll. Each expandable member 14 can deform independently, allowing different portions of the inflatable doll 100 to move independently and precisely.

The second air blower 15 can work intermittently, and deflate the main part 12 and/or the secondary part 13 intermittently to move the main part 12 and/or the secondary part 13. Under the action of the second air blower 15, the expandable member 14 may be deflated two to eight times per minute The second air blower 15 is disposed in the expandable member 14 and faces towards the outside of the expandable member 14, and a third air outlet portion 151 of the second air blower 15 faces towards the outside of the expandable member 14. Thus, air within the expandable member 14 can be directed out of the expandable member 14 to move the primary part 12 and/or the secondary part 13. In one embodiment, the third air outlet portions 151 of the second air blowers 15 may face towards the same direction or different directions.

Figure 19:
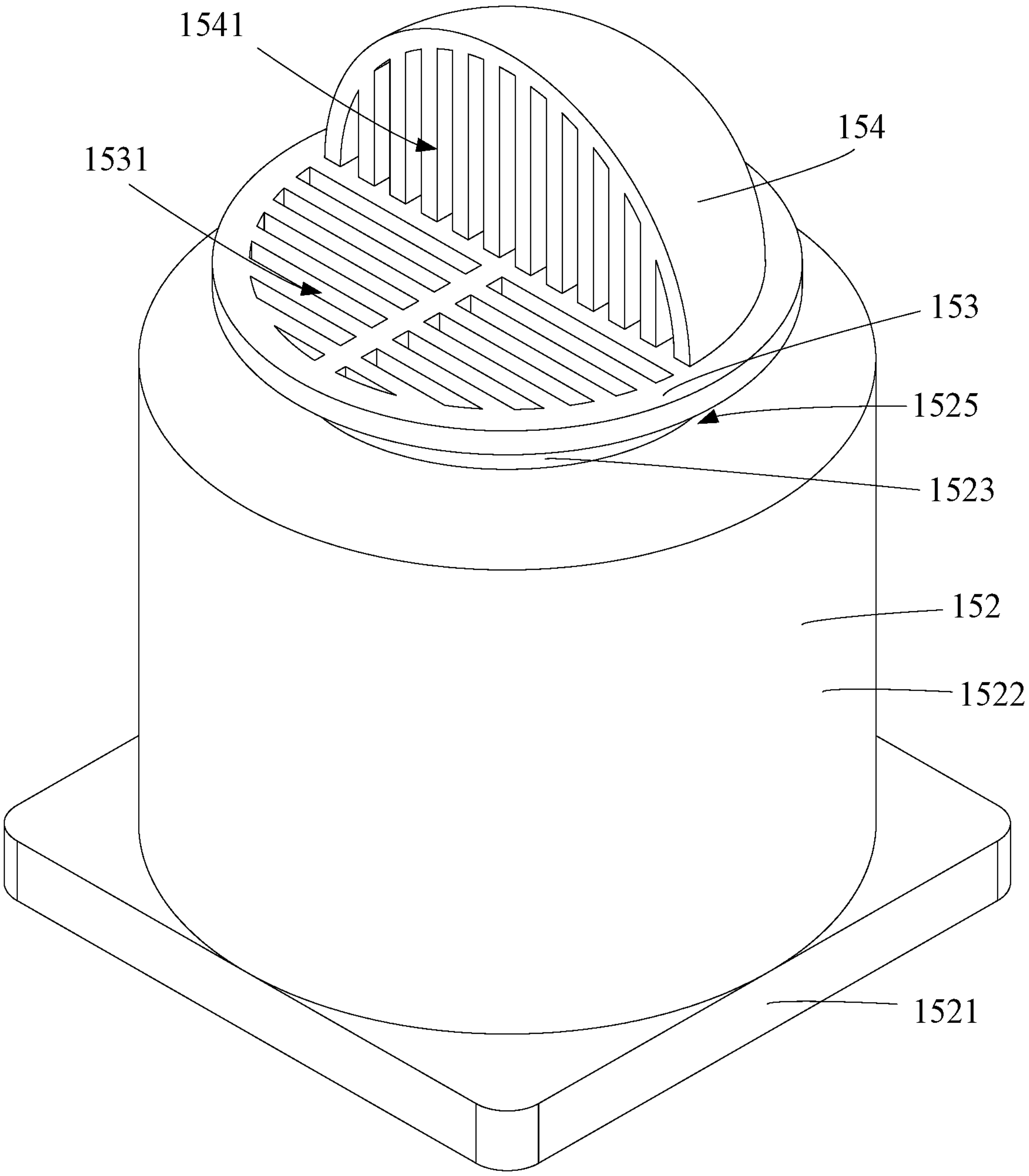
FIG. 19 is a structural schematic view of the second air blower of the inflatable doll in FIG. 1.
Figure 20:
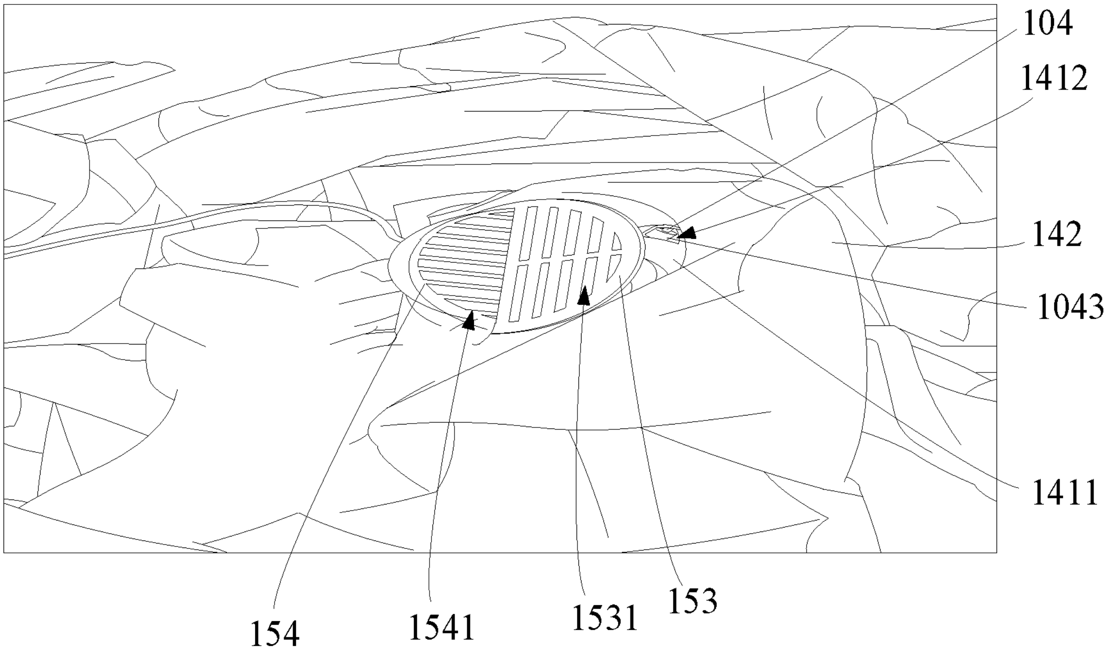
FIG. 20 is a structural schematic view of the second air blower and a portion of the expandable member.
Figure 21:
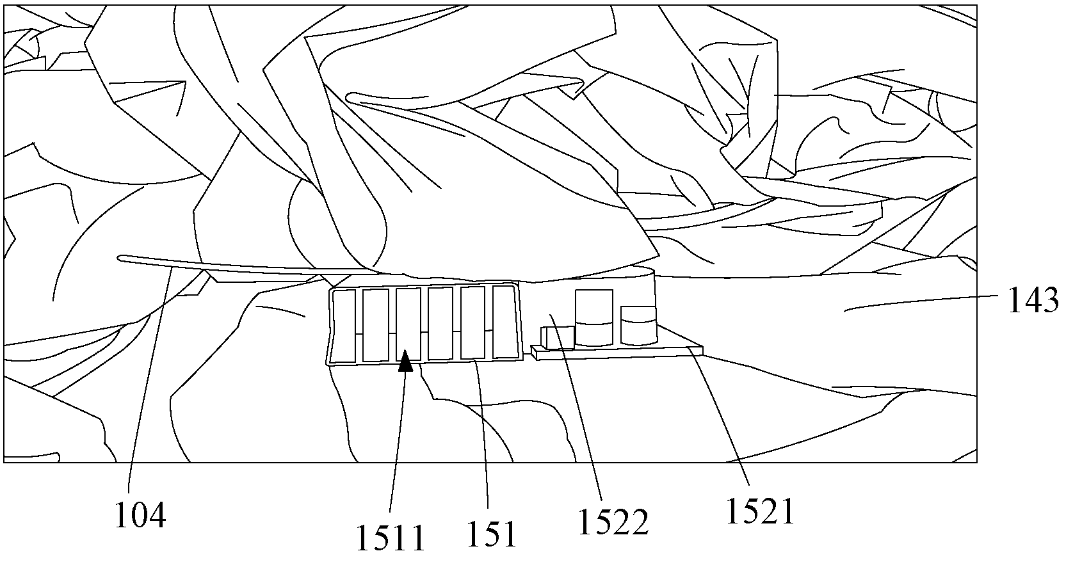
FIG. 21 is another structural schematic view of the second air blower and a portion of the expandable member.

The expandable member 14 includes an inner side 142 and an outer side 143. The through hole 141 passes through the inner side 142 and the outer side 143. The second air blower 15 can be a simple fan as shown in FIGS. 15-18. In another embodiment, the second air blower 15 has a complicate structure as shown in FIGS. 19-21, the second air blower 15 further includes a protective housing 152, a third air inlet portion 153 and a fourth air inlet portion 154, the third air inlet portion 153 and the fourth air inlet portion 154 are both protruded from the protective housing 152 and received in the expandable member 14, the third air outlet portion 151 is also protruded from the protective housing 152, and the third air outlet portion 151 is arranged outside the expandable member 14. The third air inlet portion 153 is connected with the fourth air inlet portion 154. Preferably, the third air inlet portion 153 is perpendicular to the fourth air inlet portion 154. The protective housing 152 includes a support wall 1521 arranged outside the expandable member 14, a cylindrical body 1522 connected with the support wall 1521 and arranged outside the expandable member 14, and a connecting portion 1523 connected between the cylindrical body 1522 and the third air inlet portion 153 and arranged in the expandable member 14. A fan 1524 (also referred to as an impeller) is arranged in the cylindrical body 1522 and configured to direct the air in the expandable member 14 out.

The third air inlet portion 153 extends from the connecting portion 1523 of the protective housing 152 along a first direction, the first direction is parallel with an axis direction of the protective housing 152. The third air outlet portion 151 extends from the support wall 1521 of the protective housing 152 along a second direction. The third air inlet portion 153 has a round shape, and a diameter of the third air inlet portion 153 is greater than that of the connecting portion 1523, and a diameter of the cylindrical body 1522 is also greater than that of the connecting portion 1523, such that the third air inlet portion 153, the connecting portion 1523 and the cylindrical body 1522 cooperatively form a fixing portion 1525 which may be a fixing groove. The second direction is perpendicular to the first direction. The fourth air inlet portion 154 has a semicircle shape and extends from the third air inlet portion 153 along the first direction. The third air inlet portion 153 defines at least one first inlet 1531, the fourth air inlet portion 154 defines at least one second inlet 1541, the third air outlet portion 151 defines at least one outlet 1511 communicated with the first inlet 1531 and the second inlet 1541. The air in the expandable member 14 is directed out through the first inlet 1531, the second inlet 1541 and the outlet 1511, and the air in the body 10 can flow into the expandable member 14 through the outlet 1511, the first inlet 1531 and the second inlet 1541. In one embodiment, an extension direction of the first inlet 1531 is perpendicular to the first direction, an extension direction of the second inlet 1541 is parallel with the first direction, and an extension direction of the outlet 1511 is also perpendicular to the first direction.

An edge of the through hole 141 is connected with the second air blower 15 by another connecting element 104. The edge of the through hole 141 crimps to form a receiving portion 1411, and the receiving portion 1411 defines a through hole 1412, and the second air blower 15 is partially accommodated in the expandable member 14. Specifically, both the third air inlet part 153 and the fourth air inlet part 154 are accommodated in the expandable member 14, the third air outlet part 151 is arranged outside the expandable member 14, the receiving portion 1411 is arranged around the fixed portion 1525, and the connecting element 104 connects the second air blower 15 with the expandable member 14. When the body 10 and the expandable member 14 are inflated, since the expandable member 14 is connected with the body 10, the expandable member 14 can fix or support the second air blower 15.

Specifically, there are at least two expandable members 14 arranged in the main part 12 and adjacent to each other at a same height, the second air blowers 15 corresponding to the at least two expandable members 14 in the main part 12 are arranged towards the same direction or towards different directions; there are at least two expandable members 14 arranged in the secondary part 13 and adjacent to each other at a same height, the second air blowers 15 corresponding to the at least two expandable members 14 in the secondary part 13 are arranged towards the same direction or towards different directions; there are two expandable members 14 respectively arranged in two secondary parts 13 and adjacent to each other at a same height, the second air blowers 15 corresponding to the two expandable members 14 in the two secondary parts 13 are arranged towards the same direction or arranged towards different directions.

Figure 15:
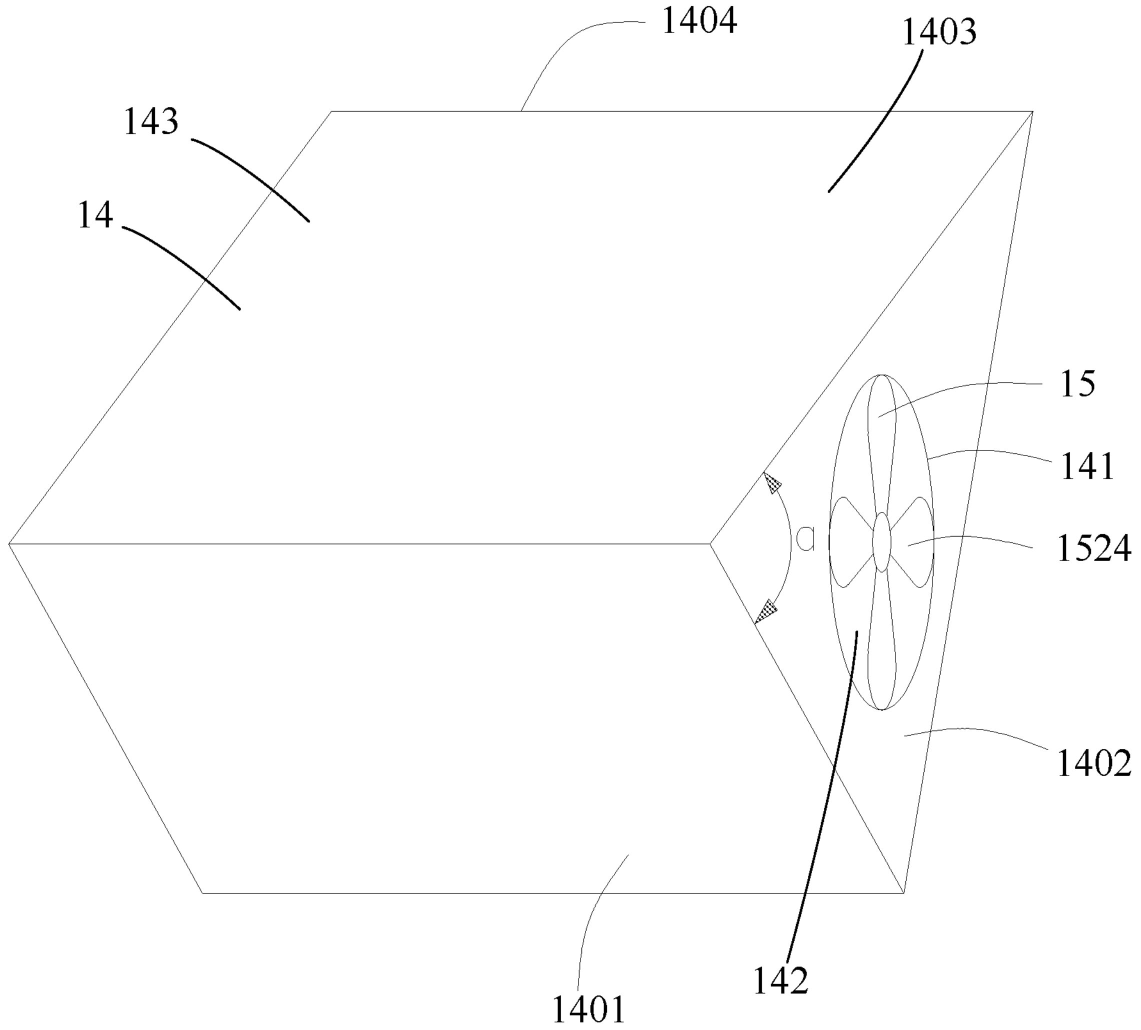
FIG. 15 is a structural schematic view of an expandable member of the inflatable doll in FIG. 1.

Referring to FIG. 15, the expandable member 14 in the inflated state has a substantially triangular prism shape, which includes a bottom surface 1401, two opposite triangular surfaces 1402 respectively connected with two sides of the bottom surface 1401, and two parallelogram surfaces 1403 connected with the bottom surface 1401 and the triangular surface 1402. An area of a cross section of the expandable member 14 gradually decreases in a direction from the bottom surface 1401 to the connecting edge 1404. When the expandable member 14 is inflated, an angle $\alpha$ formed by the bottom surface 1401 and the parallelogram surface 1403 is about 30-60°. For example, the angle $\alpha$ is 30°, 40°, 50°, or 60°. The second air blower 15 is arranged on the bottom surface 1401, the triangular surfaces 1402 or the parallelogram surface 1403. In one embodiment, at least one of the bottom surface 1401, the triangular surface 1402, and the parallelogram surface 1403 is a flat surface or a curved surface. The second air blower 15 which has a simple structure or the complicate structure is mounted on the surface of the expandable member 14 that is not sewed or glued with the body 10.

Figure 16:
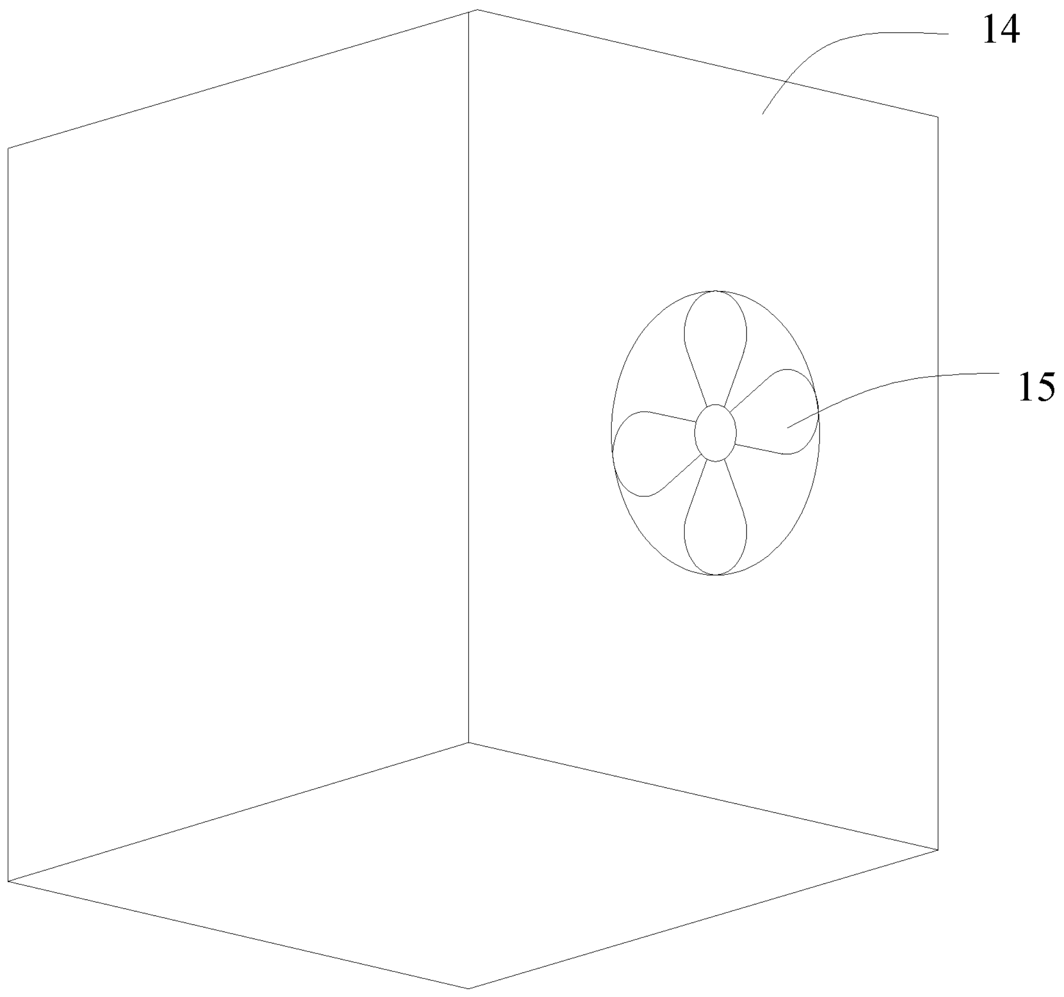
FIG. 16 is a structural schematic view of another expandable member of the inflatable doll in FIG. 1.
Figure 17:
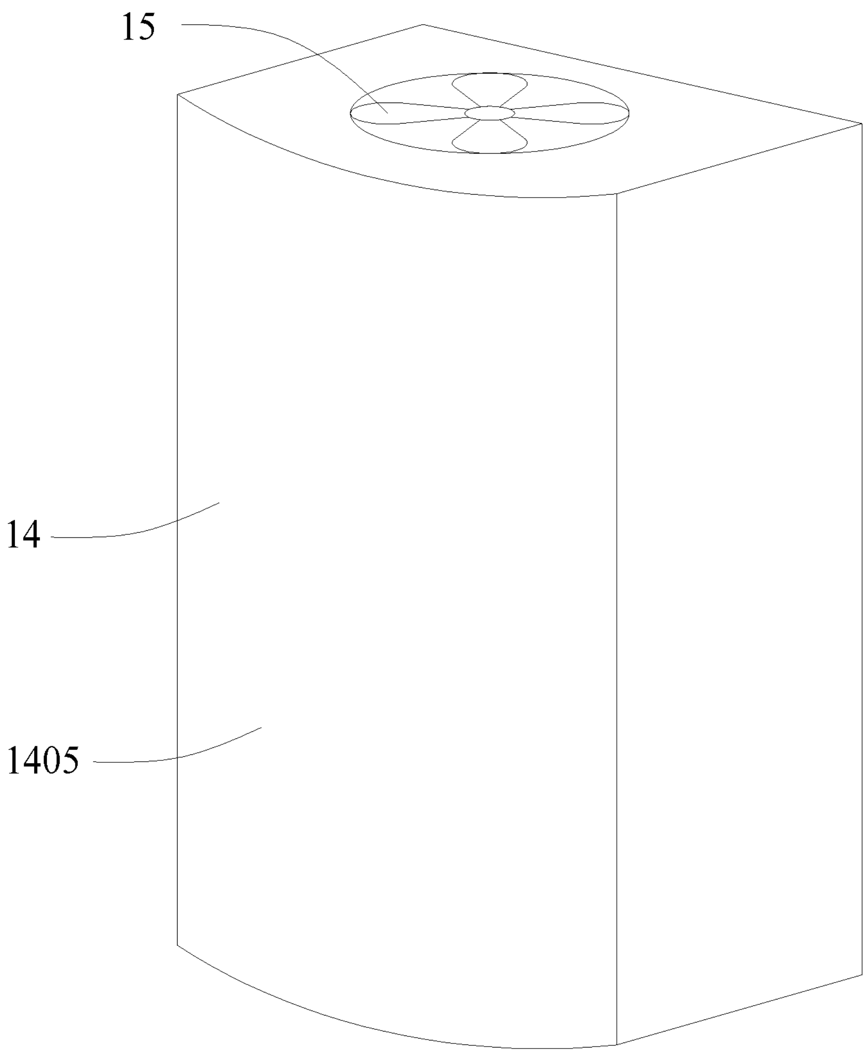
FIG. 17 is a structural schematic view of a further expandable member of the inflatable doll in FIG. 1.
Figure 18:
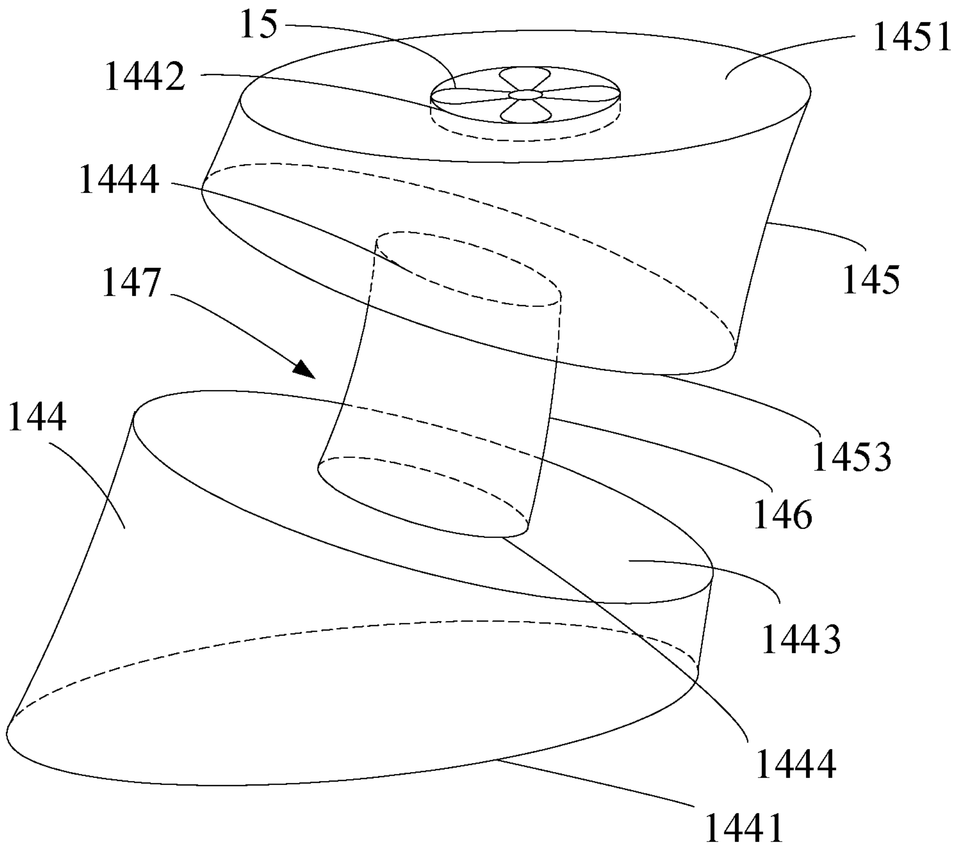
FIG. 18 is a structural schematic view of another expandable member of the inflatable doll in FIG. 1.

Referring to FIGS. 16-18, the expandable member 14 has a substantially hexahedral shape, a cube shape, a parallelepiped shape, or an irregular hexahedral shape. At least one surface 1405 of the expandable member 14 is a flat surface or a curved surface.

The expandable member 14 has an irregular shape and includes a first expandable portion 144, a second expandable portion 145 and a connecting portion 146, and the first expandable portion 144 is communicated with the second expandable portion 145 by the connecting portion 146. The cross section of the first expandable portion 144 or the second expandable portion 145 is substantially trapezoidal shaped. The cross-section of the connecting portion 146 is substantially circular, square or irregular shaped. The connecting portion 146 is rigid and and cannot deform, or the connecting portion 146 is flexible, expandable and deformable.

The area of the cross-section of the first expandable portion 144 is one to three times that of the connecting portion 146, or the area of the cross-section of the second expandable portion 145 is one to three times that of the connecting portion 146, to form a notch 147 between the first expandable portion 144 and the second expandable portion 146. The first expandable portion 144 and the second expandable portion 145 can deform into the notch 147, such that the body 10 can deform faster and move downwards for a much more distance in a shorter time.

The first expandable portion 144 includes a first surface 1441 opposite to the connecting portion 146, the second expandable portion 145 includes a second surface 1451 opposite to the connecting portion 146, the first surface 1441 is parallel to the second surface 1451, and the first surface 1441 and second surface 1451 incline in the same direction, to increase a size of notch 147.

The first surface 1441 or the second surface 1451 defines a through hole 1442 for mounting the second air blower 15. The first surface 1441 is arranged towards the accessory 30, and the second surface 1451 is arranged opposite to the accessory 30.

A third surface 1443 of the first expandable portion 144 and a fourth surface 1453 of the second expandable portion 145 both define a through hole 1444 communicated with the connecting portion 146.

The above description is merely some embodiments. It should be noted that for one with ordinary skills in the art, improvements can be made without departing from the concept of the present disclosure, but these improvements shall fall into the protection scope of the present disclosure.

What is claimed is:

1. An accessory, applied to an inflatable doll, comprising:

a housing, comprising a first air inlet portion and at least one first air outlet portion;

a plurality of first air blowers, at least partially mounted in the housing, and each first air blower comprises:

a second air inlet portion, communicated with the first air inlet portion; and a second air outlet portion, communicated with the at least one first air outlet portion; and a main controller, electrically connected to the first air blowers, wherein at least some of the first air blowers are arranged to correspond to different portions of the inflatable doll, and the controller is configured to control the first air blowers to inflate and deflate respective portions of the inflatable doll independently, so that the inflatable doll is capable of acting dynamically, wherein the accessory further comprises:

a sound system, electrically connected with the main controller;

a sound collecting member, electrically connected with the main controller, and configured to collect a voice and transmit a voice signal to the main controller;

a first speech recognizing server, electrically connected with the main controller and configured to recognize a processed voice signal of main controller and transmit a recognition result to the main controller;

a chip, electrically connected with the main controller and pre-storing vocabularies, the chip is configured to output a first feedback to the main controller according to the vocabularies and recognition result; and a second speech recognizing server, electrically connected with the main controller and configured to receive the first feedback from the main controller and transmit a second feedback containing a first sound signal to the sound system according to the first feedback, so that the accessory is capable of intelligently communicating with a user, wherein the main controller is capable of sending instructions to the first air blowers and the sound system according to the voice signal to control operations of the first air blowers and the sound system.

2. The accessory according to claim 1, further comprising:

the sound collecting member is configured to collect sound emitted from the sound system and transmit a second sound signal to the main controller, so that the main controller is capable of controlling the operation of at least one first air blower in the first air blowers according to the second sound signal to deform the inflatable doll.

3. The accessory according to claim 1, further comprising:

a sensor, configured to detect whether someone enters into a sensing area of the sensor, the sensor is configured to transmit a sense signal to the main controller when the sensor detects that someone enters into the sensing area, and the main controller controls the sound system to play voice information according to the sense signal.

4. The accessory according to claim 1, further comprising:

a sensor, configured to detect whether someone enters into a sensing area of the sensor, the sensor is configured to transmit a sense signal to the main controller when the sensor detects that someone enters into the sensing area, and the main controller controls the operation of at least one first air blower in the first air blowers according to the sense signal to deform the inflatable doll.

5. The accessory according to claim 1, further comprising:

a sensor, configured to detect whether someone enters into a sensing area of the sensor, the sensor is configured to transmit a sense signal to the main controller when the sensor detects that someone enters into the sensing area, and the main controller controls the operation of at least one first air blower in the first air blowers according to the sense signal and the voice signal to deform the inflatable doll.

6. The accessory according to claim 1, wherein, the sound system is arranged on a top surface of the housing, and the accessory further comprising:

a lamp, arranged on the sound system, the lamp comprises:

at least one illuminating part, configured to emit light; and a lampshade, configured to cover the at least one illuminating part, and the light from the at least one illuminating part is configured to form an ambient light after passing through the lampshade.

7. The accessory according to claim 6, wherein said lamp further comprises:

a secondary controller, configured to control an operation of the at least one illuminating part; and a sound collecting element, configured to collect sound from the sound system and transmit a third sound signal to the secondary controller, and the secondary controller controls the operation of the at least one illuminating part according to the third sound signal, so that a lighting effect of the at least one illuminating part matches with a rhythm of sound from the sound system.

8. The accessory according to claim 1, further comprising:

a lamp, electrically connected with the main controller;

the main controller is capable of sending an instruction to the lamp according to the voice signal to control an operation of the lamp.

9. The accessory according to claim 1, wherein the housing comprises:

a side wall, comprising the first air inlet portion, wherein the second air inlet portion is integratedly formed with the first air inlet portion.

10. The accessory according to claim 1, wherein the housing further comprises:

a top cover, comprising the at least one first air outlet portion, wherein the second air outlet portion is integratedly formed with the at least one first air outlet portion.

11. The accessory according to claim 1, wherein after the inflatable doll is inflated, the controller is configured to control the first air blowers to inflate and deflate respective portions of the inflatable doll independently, so that the inflatable doll is capable of acting dynamically.

12. The accessory according to claim 1, wherein the housing further comprises a top cover defining a plurality of first air outlet portions, the accessory further comprises the sound system and a lamp, the sound system is arranged on the top cover, the lamp is arranged on the sound system, the first air outlet portions are configured to surround the sound system.

13. An inflatable doll, comprising:

a body, defining a cavity, the body comprises a front portion, a rear portion, a left portion and a right portion; and an accessory, comprising:

a housing, comprising a first air inlet portion and at least one first air outlet portion;

a plurality of first air blowers, at least partially mounted in the housing, and each first air blower comprises a second air inlet portion communicated with the first air inlet portion, and a second air outlet portion communicated with the at least one first air outlet portion; and a main controller, electrically connected to the first air blowers, wherein at least some of the first air blowers are arranged to correspond to different portions of the inflatable doll, and the controller is configured to control the first air blowers to inflate and deflate respective portions of the inflatable doll independently, so that the inflatable doll is capable of acting dynamically:

wherein, the body is connected with the accessory, the at least one first air outlet portion and the second air outlet portions are all communicated with the cavity, and the main controller is configured to control at least one first air blower of the first air blowers to blow air into the cavity through the at least one first air outlet portion and the second air outlet portions, wherein the accessory further comprises:

a sound system, electrically connected with the main controller;

a sound collecting member, electrically connected with the main controller, and configured to collect a voice and transmit a voice signal to the main controller;

a first speech recognizing server, electrically connected with the main controller and configured to recognize a processed voice signal of main controller and transmit a recognition result to the main controller:

a chip, electrically connected with the main controller and pre-storing vocabularies, the chip is configured to output a first feedback to the main controller according to the vocabularies and recognition result; and a second speech recognizing server, electrically connected with the main controller and configured to receive the first feedback from the main controller and transmit a second feedback containing a first sound signal to the sound system according to the first feedback, so that the accessory is capable of intelligently communicating with a user, wherein the main controller is capable of sending instructions to the first air blowers and the sound system according to the voice signal to control operations of the first air blowers and the sound system.

14. The inflatable doll according to claim 13, further comprising:

a plurality of expandable members, arranged in the cavity and connected with the body; and a plurality of second air blowers, electrically connected with the main controller, each of the second air blowers is arranged on one corresponding expandable member and configured to direct air in the corresponding expandable member out, so that the expandable members are capable of deforming independently under actions of the second air blowers.

15. The inflatable doll according to claim 14, wherein the accessory further comprises:

the sound collecting member is configured to collect sound emitted from the sound system and transmit a second sound signal to the main controller, so that the main controller is capable of controlling an operation of at least one first air blower in the first air blowers or an operation of the at least one second air blower according to the second sound signal to deform the inflatable doll.

16. The inflatable doll according to claim 14, wherein the main controller is capable of sending instructions to the first air blowers, the second air blowers and the sound system according to the voice signal, to control operations of the first air blowers, the second air blowers and the sound system.

17. The inflatable doll according to claim 14, wherein the accessory further comprises:

a sensor, configured to detect whether someone enters into a sensing area of the sensor, the sensor is configured to transmit a sense signal to the main controller when the sensor detects that someone enters into the sensing area, and the main controller controls the operation of at least one first air blower in the first air blowers or an operation of the at least one second air blower according to the sense signal to enable the inflatable doll to act dynamically.

18. An accessory, applied to an inflatable doll, comprising:

a housing, comprising a first air inlet portion and at least one first air outlet portion;

a plurality of first air blowers, at least partially mounted in the housing, and each first air blower comprises:

a second air inlet portion, communicated with the first air inlet portion; and a second air outlet portion, communicated with the at least one first air outlet portion;

a sound system, arranged on a top portion of the housing;

a lamp, arranged on the sound system; and a main controller, electrically connected to the first air blowers, the sound system and the lamp, and configured to control operations of the first air blowers, the sound system and the lamp, wherein the first air blowers are arranged to correspond to different portions of the inflatable doll, and after the inflatable doll is inflated, the controller is configured to control the first air blowers to inflate and deflate respective portions of the inflatable doll independently, so that the inflatable doll is capable of acting dynamically, wherein the accessory further comprises:

a sound collecting member, electrically connected with the main controller, and configured to collect a voice and transmit a voice signal to the main controller;

a first speech recognizing server, electrically connected with the main controller and configured to recognize a processed voice signal of main controller and transmit a recognition result to the main controller;

a chip, electrically connected with the main controller and pre-storing vocabularies, the chip is configured to output a first feedback to the main controller according to the vocabularies and recognition result; and a second speech recognizing server, electrically connected with the main controller and configured to receive the first feedback from the main controller and transmit a second feedback containing a sound signal to the sound system according to the first feedback, so that the accessory is capable of intelligently communicating with a user, wherein the main controller is capable of sending instructions to the first air blowers and the sound system according to the voice signal to control operations of the first air blowers and the sound system.

19. The accessory according to claim 18, wherein the housing further comprises a top cover defining a plurality of first air outlet portions, the accessory further comprises the sound system and the lamp, the sound system is arranged on the top cover, the lamp is arranged on the sound system, the first air outlet portions are configured to surround the sound system.

* * * * *